(12) United States Patent
Wada et al.

(10) Patent No.: US 11,092,246 B2
(45) Date of Patent: Aug. 17, 2021

(54) GATE VALVE

(71) Applicant: ULVAC, INC., Chigasaki (JP)

(72) Inventors: Shinichi Wada, Chigasaki (JP); Hideaki Inoue, Chigasaki (JP); Kouji Shibayama, Chigasaki (JP); Takuya Wade, Chigasaki (JP); Harukuni Furuse, Chigasaki (JP); Jirou Endo, Chigasaki (JP); Mikiya Suzuki, Chigasaki (JP); Shinnosuke Tokuhira, Chigasaki (JP); Takaaki Terui, Chigasaki (JP)

(73) Assignee: ULVAC, INC., Chigasaki (JP)

( * ) Notice: Subject to any disclaimer, the term of this patent is extended or adjusted under 35 U.S.C. 154(b) by 0 days.

(21) Appl. No.: 16/969,102

(22) PCT Filed: Feb. 5, 2019

(86) PCT No.: PCT/JP2019/004016
§ 371 (c)(1),
(2) Date: Aug. 11, 2020

(87) PCT Pub. No.: WO2019/176378
PCT Pub. Date: Sep. 19, 2019

(65) Prior Publication Data
US 2021/0041039 A1    Feb. 11, 2021

(30) Foreign Application Priority Data
Mar. 12, 2018  (JP) .............................. JP2018-044795

(51) Int. Cl.
*F16K 3/10*     (2006.01)
*F16K 3/18*     (2006.01)
(Continued)

(52) U.S. Cl.
CPC .................. *F16K 3/10* (2013.01); *F16K 3/18* (2013.01); *F16K 3/188* (2013.01); *F16K 51/02* (2013.01); *F16K 3/06* (2013.01)

(58) Field of Classification Search
CPC . F16K 51/02; F16K 3/18; F16K 3/188; F16K 3/10; F16K 3/04; F16K 3/06
See application file for complete search history.

(56) References Cited

U.S. PATENT DOCUMENTS 3,343,562 A  *  9/1967  Combes .................. F16K 3/188
                                                137/315.16
5,577,707 A     11/1996 Brida
(Continued)

FOREIGN PATENT DOCUMENTS

CN     102575779     7/2012
CN     103403416    11/2013
(Continued)

OTHER PUBLICATIONS

English translation of International Search Report from corresponding PCT Application No. PCT/JP2019/004016, dated May 7, 2019.
(Continued)

*Primary Examiner* — David Colon-Morales
(74) *Attorney, Agent, or Firm* — Grossman, Tucker, Perreault & Pfleger, PLLC

(57) ABSTRACT

A gate valve comprising a plurality of first force-applying units built in a valve box; a second force-applying unit disposed between a first movable valve and a second movable valve; and a third force-applying unit. The first force-applying units are driven by incompressible fluid and have a function of applying a force to the first movable valve to be directed to the first opening portion in the flow passage direction and thereby causing the seal portion to be in close contact with a valve box inner surface located at the periphery of the first opening portion. The gate valve includes an
(Continued)

incompressible-fluid driver that drives, the first force-applying units by incompressible fluid.

2 Claims, 28 Drawing Sheets

(51) Int. Cl.
*F16K 51/02* (2006.01)
*F16K 3/06* (2006.01)

(56) References Cited

U.S. PATENT DOCUMENTS

| | | | |
|---|---|---|---|
| 6,561,484 B2 | 5/2003 | Nakagawa et al. | |
| 7,413,162 B2 * | 8/2008 | Geiser | F16K 3/10 251/175 |
| 7,828,267 B2 * | 11/2010 | Iwabuchi | F16K 39/045 251/175 |
| 8,434,511 B2 * | 5/2013 | Williams | F16K 3/10 137/340 |
| 8,550,430 B2 | 10/2013 | Lamprecht et al. | |
| 8,733,734 B2 * | 5/2014 | Nakamura | F16K 1/2085 251/204 |
| 8,763,985 B2 * | 7/2014 | Miki | F16K 3/10 251/161 |
| 10,612,673 B2 * | 4/2020 | Wada | F16K 3/10 |
| 10,683,942 B2 * | 6/2020 | Bohm | F16K 31/041 |

FOREIGN PATENT DOCUMENTS

| | | |
|---|---|---|
| CN | 106015615 | 10/2016 |
| CN | 109451748 | 3/2019 |
| JP | 11-336706 | 12/1999 |
| JP | 3425938 | 5/2003 |
| JP | 2004-108471 | 4/2004 |
| JP | 2004108471 A * | 4/2004 |
| JP | 365515 | 3/2005 |
| JP | 3655715 | 3/2005 |
| JP | 2012-251624 | 12/2012 |
| JP | 2013-32840 | 2/2013 |
| JP | 5613087 | 10/2014 |

OTHER PUBLICATIONS

Valve Drive, Practical Valve Design Manual, 3rd edition, Chapter 8, p. 1512, Oct. 2012, China Machine Press. Concise explanation of relevancy can be found in the Chinese Office Action submitted herewith.

Office Action from related Chinese Appln. No. 201980001764.3, dated Jul. 21, 2020. English translation attached.

Office Action from related Taiwanese Appln. No. 108104613, dated Dec. 23, 2019. English translation of the Search Report attached.

* cited by examiner

Prior Art

GATE VALVE

FIELD

The present disclosure relates to a gate valve which is suitable for use in a pendulum valve, a direct acting valve, or the like, which slidably operates a valve body in addition to operation of opening and closing a flow passage using the valve body (valve plate). Particularly, the present disclosure relates to a gate valve which isolates (closes) a flow passage that connects two spaces having pressures different from each other and isolates a flow passage that connects two spaces carrying out processings different from each other in a vacuum apparatus or the like and which releases this isolated state (communicates the two spaces).

This application claims priority from Japanese Patent Application No. 2018-044795 filed on Mar. 12, 2018, the contents of which are incorporated herein by reference in their entirety.

BACKGROUND

Gate valves are provided in a vacuum apparatus or the like, and the gate valves separate two spaces in which the vacuum degrees thereof are different from each other such as between a chamber and pipes, between pipes, between a pipe and a pump, or the like; and the gate valves communicate the two spaces. As such a gate valve, various valves are known.

For example, a structure is known in which a valve plate is inserted into a valve opening-closing position of a flow passage by sliding a valve plate, furthermore, the flow passage is separated (valve closing operation) or flow passages are communicated by operating the aforementioned valve plate (valve opening operation) by operating this valve plate. Additionally, the valve plate is moved to a safety position located in a valve box from the flow passage by sliding the valve plate. As a valve having such a structure, a pendulum valve, a direct acting valve, a door valve, or the like is known.

A direct acting gate valve has a constitution in which a valve plate is disposed in a hollow portion of a valve box. A first opening portion and a second opening portion constituting a flow passage are formed at the valve box. The valve plate is securely fixed to a valve rod (support body). In this structure, the aforementioned valve plate is inserted into the valve opening-closing position of the opening portion (flow passage) by moving straight the aforementioned valve rod in the longitudinal direction thereof, or the aforementioned valve plate is moved to the safety position at which the opening portion is not formed.

As a conventional direct acting gate valve, a gate valve is known which is provided with a valve body that is configured to include two of a first valve plate and a second valve plate which are connected to each other with bellows interposed therebetween, an actuator be disposed at the center portion of the valve plate between these two valve plates, and a valve box at which an opening portion constituting the flow passage is formed. In this gate valve, the flow passage is closed due to the first valve plate coming in contact with and pressing onto the peripheral inner surface of the opening portion of the valve box by operating the actuator, or the flow passage is released due to separating the first valve plate from the inner surface of the aforementioned valve box by operating the actuator (for example, refer to Patent Document 1).

Additionally, a pendulum gate valve has a constitution in which a valve box having a hollow portion, a support body, and a valve body (a valve plate in the case of the structure in which a seal ring plate is provided at an opening portion) which is securely fixed to this support body. In the valve box, a first opening portion and a second opening portion constituting a flow passage are formed. The support body is securely fixed to a rotation shaft in the hollow portion and is expanded in a direction parallel to the plane perpendicular to the rotation shaft. In this gate valve, the aforementioned valve body is turned by rotating the aforementioned rotation shaft, therefore, the above-described valve body is inserted into the valve opening-closing position of the opening portion (flow passage) or the above-described valve body is moved to the safety position at which the opening portion is not formed.

As a conventional pendulum gate valve, a constitution is known in which a valve plate that is capable of rotating around a rotation shaft in a hollow portion of a housing, a slidable seal ring plate that is disposed at an opening portion of the housing, and an actuator allowing the aforementioned seal ring plate to slide on a flange formed integrally with the housing are provided. In this gate valve, the flow passage is closed due to the aforementioned seal ring plate coming in contact with and pressing onto the aforementioned valve plate, or the flow passage is released by separating the aforementioned seal ring plate from the aforementioned valve plate (for example, refer to Patent Document 2).

The actuator provided in this pendulum gate valve has a structure in which a bolt, a ring-shaped chamber (cylinder), a piston, and a spring are arranged in series in the sliding direction of the seal ring plate. For this reason, when the flow passage is being closed, the restorative force generated in the spring is transmitted to the seal ring plate through the piston, the cylinder, and the bolt.

As such a pendulum gate valve, a valve is disclosed which airtightly blocks a flow passage, has degree of abrasion resistance, and is ease in maintenance (for example, refer to Patent Document 3). In this gate valve, an outer valve body is connected to a drive unit via an arm, and the outer valve body vertically moves in an opening axis. Consequently, an activation device which prompts the arm to vertically move via a power transmission device needs a considerable driving power depending on an increase in a surface area of the gate valve.

Additionally, in the case of applying the configuration disclosed in Patent Document 3 to a large-scale gate valve, in addition to that the volume of an O-ring that is to be pressed increases, the O-ring is disposed at a position distant from the rotation shaft. Because of this, since it is required to design the rotation shaft so as to become a rigid body that bears against a necessary moment load, it contributes to an increase in a weight of the gate valve.

Accordingly, although the configuration disclosed in Patent Document 3 is effective to a small gate valve, it is unsuitable for a large-scale gate valve.

The inventors have developed a gate valve having a configuration which can increase a surface area of the aforementioned gate valve and can carry out isolation operation with a high degree of reliability by a simple configuration, and filed a patent application (Patent Document 4). In this gate valve, a movable valve that forms a valve body is configured to include a plurality of movable valves in a stacking direction (for example, a movable valve frame (first movable valve), a movable valve plate (second movable valve)), and an air cylinder (second force-applying unit) is provided at a position at which both movable valves are connected. In order to drive the air cylinder, it has been necessary to provide, inside the movable valve frame (first movable valve), a line (supply line) that extends from the outside of the gate valve to the air cylinder through the rotation shaft of the gate valve and introduces compressed air thereinto.

In the valve body structure in which the air cylinder or the supply line are provided inside the gate valve as stated above, although isolation operation with a high degree of reliability can be realized, a weight of the valve body increases, a large driving power is necessary when the valve body moves upward and downward or the valve body moves while revolving, and therefore simplification of the configuration of the valve body and weight saving thereof have been required.

At the same time, although the gate valve becomes larger in size in order to be able to carry out isolation operation using a large surface area thereof, a pressure of control fluid (compressed air or the like) that is supplied to the gate valve does not much increase. Consequently, in order to drive a movable unit for a valve body or the like having an increased weight, it is necessary to increase output of the movable unit, and there is a tendency that volumes of components constituting the gate valve includes. However, space-saving is always required in the apparatus, the manufacturing line, or the like in which the gate valve is installed, and there was a demand for space-saving and reduction in size for components constituting the gate valve.

Moreover, in the mechanism including an air cylinder inside the valve body, in the case where the proportion of the surface area receiving a pressure to the valve body is, for example, 25%, the cancellation rate of a back pressure is approximately 75%, a large sealing force tends to be required. Consequently, development of an excellent back pressure cancellation mechanism has been expected. Here, the back pressure means that a pressure is applied to a valve body in a direction from a valve closed state to a valve opened state, and a back pressure cancellation mechanism means a mechanism that does not directly oppose the back pressure (a mechanism that does not generates a back pressure).

Furthermore, a gate valve has been demanded which has not only the high reliability of the isolation operation using the large surface area but also has a normally close configuration that closes a flow passage during an emergency such as shut down of power supply, stop of a driving pressure of control fluid such as compressed air, or the like.

The normally close means that a flow passage is closed and a flow passage closed state is maintained in a state where a power source such as compressed air that drives a valve body or the like is not operated when the valve carries out isolation operation.

PATENT DOCUMENTS (Patent Document 1) Japanese Patent No. 3425938
(Patent Document 2) Japanese Patent No. 3655715
(Patent Document 3) Japanese Unexamined Patent Application, First Publication No. 2013-32840
(Patent Document 4) Japanese Patent No. 5613087

SUMMARY

Illustrative Problems to be Solved

The present disclosure was made with respect to the above-described conventional situation, and a non-limiting includes a gate valve that can carry out isolation operation with a high degree of reliability, achieves a weight saving of a movable valve, and realize 100% of a back pressure cancellation rate, can carry out isolation operation using a large surface area thereof, achieves weight saving and space-saving of components constituting the gate valve, and has a normally close configuration.

Means for Solving the Problems

A gate valve according to a first aspect of the present disclosure includes: a valve box having a hollow portion, a first opening portion, and a second opening portion, the first opening portion and the second opening portion being provided so as to face each other with the hollow portion interposed therebetween and forming a flow passage passing through the hollow portion; a neutral valve body that is arranged in the hollow portion of the valve box and is capable of sealing the first opening portion; and a rotation shaft that functions as a position switcher that drives the neutral valve body between a valve sealing position at which the neutral valve body is in a state of sealing the first opening portion and a valve opening position at which the neutral valve body is in an open state of being retracted from the first opening portion, the rotation shaft having an axis line extending in a flow passage direction. The neutral valve body includes: a neutral valve connected to the position switcher; and a movable valve connected to the neutral valve so that a position thereof with respect to the neutral valve in the flow passage direction is changeable. The movable valve includes a first movable valve and a second movable valve, the first movable valve including a seal portion that is provided thereon, is circumferentially provided on the movable valve, and is to be in close contact with a valve box inner surface located at a periphery of the first opening portion, the first movable valve being connected to the neutral valve so that a position thereof with respect to the neutral valve in the flow passage direction is changeable, the second movable valve being slidable relative to the first movable valve in the flow passage direction. The gate valve includes: a plurality of first force-applying units built in the valve box; a second force-applying unit disposed between the first movable valve and the second movable valve; and a third force-applying unit. The third force-applying unit causes the first movable valve to connect the neutral valve so that a position thereof with respect to the neutral valve in the flow passage direction is changeable, and the third force-applying unit applies a force to the first movable valve to be directed to a center position in the flow passage direction. The first force-applying units are driven by incompressible fluid and have a function of applying a force to the first movable valve to be directed to the first opening portion in the flow passage direction and thereby causing the seal portion to be in close contact with a valve box inner surface located at the periphery of the first opening portion. The second force-applying unit drives the first movable valve and the second movable valve so that thicknesses thereof in the flow passage direction are changeable. The gate valve includes an incompressible-fluid driver that drives, the first force-applying units by incompressible fluid. Accordingly, the aforementioned problems are solved.

A gate valve according to a second aspect of the present disclosure includes: a valve box having a hollow portion, a first opening portion, and a second opening portion, the first opening portion and the second opening portion being provided so as to face each other with the hollow portion interposed therebetween and forming a flow passage passing through the hollow portion; a neutral valve body that is arranged in the hollow portion of the valve box and is capable of sealing the first opening portion; and a rotation shaft that functions as a position switcher that drives the neutral valve body between a valve sealing position at which the neutral valve body is in a state of sealing the first opening portion and a valve opening position at which the neutral valve body is in an open state of being retracted from the first opening portion, the rotation shaft having an axis line extending in a flow passage direction. The neutral valve body includes: a neutral valve connected to the position switcher; and a movable valve connected to the neutral valve so that a position thereof with respect to the neutral valve in the flow passage direction is changeable. The movable valve includes a first movable valve and a second movable valve, the first movable valve including a seal portion that is provided thereon, is circumferentially provided on the movable valve, and is to be in close contact with a valve box inner surface located at a periphery of the first opening portion, the first movable valve being connected to the neutral valve so that a position thereof with respect to the neutral valve in the flow passage direction is changeable, the second movable valve being slidable relative to the first movable valve in the flow passage direction. The gate valve includes: a plurality of first force-applying units built in the valve box; and a second force-applying unit disposed between the first movable valve and the second movable valve. The first force-applying units are driven by incompressible fluid and have: a function of applying a force to the first movable valve to be directed to the first opening portion in the flow passage direction and thereby causing the seal portion to be in close contact with a valve box inner surface located at the periphery of the first opening portion; and a function of causing the first movable valve to connect the neutral valve so that a position thereof with respect to the neutral valve in the flow passage direction is changeable and applying a force to the first movable valve to be directed to a center position in the flow passage direction. The second force-applying unit drives the first movable valve and the second movable valve so that thicknesses thereof in the flow passage direction are changeable. The gate valve includes an incompressible-fluid driver that drives, the first force-applying units by incompressible fluid. Accordingly, the aforementioned problems are solved.

The gate valve according to the first aspect of the present disclosure includes: a valve box having a hollow portion, a first opening portion, and a second opening portion, the first opening portion and the second opening portion being provided so as to face each other with the hollow portion interposed therebetween and forming a flow passage passing through the hollow portion; a neutral valve body that is arranged in the hollow portion of the valve box and is capable of sealing the first opening portion; and a rotation shaft that functions as a position switcher that drives the neutral valve body between a valve sealing position at which the neutral valve body is in a state of sealing the first opening portion and a valve opening position at which the neutral valve body is in an open state of being retracted from the first opening portion, the rotation shaft having an axis line extending in a flow passage direction. The neutral valve body includes: a neutral valve connected to the position switcher; and a movable valve connected to the neutral valve so that a position thereof with respect to the neutral valve in the flow passage direction is changeable. The movable valve includes a first movable valve and a second movable valve, the first movable valve including a seal portion that is provided thereon, is circumferentially provided on the movable valve, and is to be in close contact with a valve box inner surface located at a periphery of the first opening portion, the first movable valve being connected to the neutral valve so that a position thereof with respect to the neutral valve in the flow passage direction is changeable, the second movable valve being slidable relative to the first movable valve in the flow passage direction. The gate valve includes: a plurality of first force-applying units built in the valve box; a second force-applying unit disposed between the first movable valve and the second movable valve; and a third force-applying unit. The third force-applying unit causes the first movable valve to connect the neutral valve so that a position thereof with respect to the neutral valve in the flow passage direction is changeable, and the third force-applying unit applies a force to the first movable valve to be directed to a center position in the flow passage direction. The first force-applying units are driven by incompressible fluid and have a function of applying a force to the first movable valve to be directed to the first opening portion in the flow passage direction and thereby causing the seal portion to be in close contact with a valve box inner surface located at the periphery of the first opening portion. The second force-applying unit drives the first movable valve and the second movable valve so that thicknesses thereof in the flow passage direction are changeable. The gate valve includes an incompressible-fluid driver that drives, the first force-applying units by incompressible fluid.

Accordingly, the third force-applying unit causes the first movable valve to connect the neutral valve so that a position thereof with respect to the neutral valve in the flow passage direction is changeable, and the third force-applying unit applies a force to the first movable valve to be directed to a center position in the flow passage direction. The first force-applying units are driven by the incompressible-fluid driver and have a function of applying a force to the first movable valve to be directed to the first opening portion in the flow passage direction and thereby causing the seal portion to be in close contact with a valve box inner surface located at the periphery of the first opening portion. The second force-applying unit is built in the movable valve and drives the first movable valve and the second movable valve so that thicknesses thereof in the flow passage direction are changeable.

A gate valve according to the second aspect of the present disclosure includes: a valve box having a hollow portion, a first opening portion, and a second opening portion, the first opening portion and the second opening portion being provided so as to face each other with the hollow portion interposed therebetween and forming a flow passage passing through the hollow portion; a neutral valve body that is arranged in the hollow portion of the valve box and is capable of sealing the first opening portion; and a rotation shaft that functions as a position switcher that drives the neutral valve body between a valve sealing position at which the neutral valve body is in a state of sealing the first opening portion and a valve opening position at which the neutral valve body is in an open state of being retracted from the first opening portion, the rotation shaft having an axis line extending in a flow passage direction. The neutral valve body includes: a neutral valve connected to the position switcher; and a movable valve connected to the neutral valve so that a position thereof with respect to the neutral valve in the flow passage direction is changeable. The movable valve includes a first movable valve and a second movable valve, the first movable valve including a seal portion that is provided thereon, is circumferentially provided on the movable valve, and is to be in close contact with a valve box inner surface located at a periphery of the first opening portion, the first movable valve being connected to the neutral valve so that a position thereof with respect to the neutral valve in the flow passage direction is changeable, the second movable valve being slidable relative to the first movable valve in the flow passage direction. The gate valve includes: a plurality of first force-applying units built in the valve box; and a second force-applying unit disposed between the first movable valve and the second movable valve. The first force-applying units are driven by incompressible fluid and have: a function of applying a force to the first movable valve to be directed to the first opening portion in the flow passage direction and thereby causing the seal portion to be in close contact with a valve box inner surface located at the periphery of the first opening portion; and a function of causing the first movable valve to connect the neutral valve so that a position thereof with respect to the neutral valve in the flow passage direction is changeable and applying a force to the first movable valve to be directed to a center position in the flow passage direction. The second force-applying unit drives the first movable valve and the second movable valve so that thicknesses thereof in the flow passage direction are changeable. The gate valve includes an incompressible-fluid driver that drives, the first force-applying units by incompressible fluid.

Consequently, the first force-applying units are driven by the incompressible-fluid driver and have a function of applying a force to the first movable valve to be directed to the first opening portion in the flow passage direction and thereby causing the seal portion to be in close contact with a valve box inner surface located at the periphery of the first opening portion. The second force-applying unit causes the first movable valve and the second movable valve to connect the neutral valve so that positions thereof with respect to the neutral valve in the flow passage direction are changeable, the second force-applying unit has a function of applying a force to the first movable valve and the second movable valve to be directed to a center position in the flow passage direction. The second force-applying unit drives the first movable valve and the second movable valve so that thicknesses thereof in the flow passage direction are changeable.

In gate valve according to the first aspect of the present disclosure, each of the first force-applying units may be disposed at a position at which the first force-applying unit acts with respect to the first movable valve in the valve box and may be provided along the first movable valve.

In gate valve according to the first aspect of the present disclosure, the first force-applying units may apply tensile force to the first movable valve.

In gate valve according to the first aspect of the present disclosure, the first force-applying units may apply a compressive force to the first movable valve.

In gate valve according to the first aspect of the present disclosure, the third force-applying unit may be a plate spring or a coil spring.

Non-limiting Effects In the gate valve according to the first aspect of the present disclosure, the movable valve disposed inside the hollow portion of the valve box is configured to include the first movable valve and the second movable valve. The gate valve has a valve structure that includes: a first movable valve; a second movable valve that is fitted into the first movable valve in a state of being slidable and sealable with respect to the first movable valve in the axial direction; and a neutral valve body that holds the first movable valve via a second force-applying unit.

Additionally, the gate valve according to the first aspect of the present disclosure includes a third force-applying unit that connects the first movable valve to the neutral valve so that a position thereof with respect to the neutral valve in the flow passage direction is changeable and applies a force to the first movable valve to be directed to a center position in the flow passage direction.

Furthermore, the gate valve according to the first aspect of the present disclosure includes a first force-applying unit that is provided inside the valve box, presses the first movable valve in a direction toward a sealing face of a valve box inner surface, and constitutes a lifting and lowering mechanism that is driven by the incompressible-fluid driver and is capable of extending and contracting.

According to this configuration, since the structure is obtained in which the valve body is configured to include two of the first movable valve and the second movable valve and two of the second force-applying unit and the third force-applying unit and another first force-applying unit is built in the valve box, weight saving of the valve structure by the weight of the first force-applying unit is achieved.

In the gate valve according to the first aspect of the present disclosure, the first force-applying unit works in the case where the gate valve becomes in the valve closed state from the valve opened state, and adversely the third force-applying unit works in the case where the gate valve becomes in the valve opened state from the valve closed state.

Moreover, due to the first force-applying unit driven by the incompressible-fluid driver, normally-close operation can be achieved.

In addition, according to the second aspect of the present disclosure, it is possible to achieve the configuration in which the first force-applying unit also has the function of the third force-applying unit. Consequently, since weight saving of the valve structure is further achieved, it is more preferable.

Here, as the incompressible-fluid driver, for example, a device that can be driven by a hydraulic pressure can adopted.

In the conventional gate valve, the valve structure includes the air cylinder, a supply line is necessary which introduces compressed air into the air cylinder, and therefore the valve structure thereof was complicated. In contrast, the first force-applying unit according to the above-mentioned aspect of the present disclosure is disposed in the valve box, is not included in the valve body structure, and is driven by the incompressible-fluid driver, and therefore contributes to simplification of the valve body structure.

Moreover, in the gate valve according to the above-mentioned aspects of the present disclosure, as the configuration is adopted in which the first force-applying unit is provided inside the valve box, since the valve box can receive reactive force of the O-ring to be pressed in the gate valve, the rigid body that forms the rotation shaft and the neutral valve can be designed without consideration of the reactive force of the O-ring. This contributes to weight saving of the valve structure.

In the conventional gate valve, an air cylinder having a back pressure cancellation rate of approximately 75% is used. In contrast, according to the aspects of the present disclosure, since the first force-applying unit is adopted which constitutes the lifting and lowering mechanism pressing the first movable valve in the direction toward the sealing face, 100% of a back pressure cancellation rate is obtained.

As a result, in the gate valve according to the above-mentioned aspects of the present disclosure, it is possible to provide a gate valve that can carry out isolation operation with a high degree of reliability, achieves a weight saving of a movable valve, and can realize 100% of a back pressure cancellation rate.

DETAILED DESCRIPTION

Figure 1:
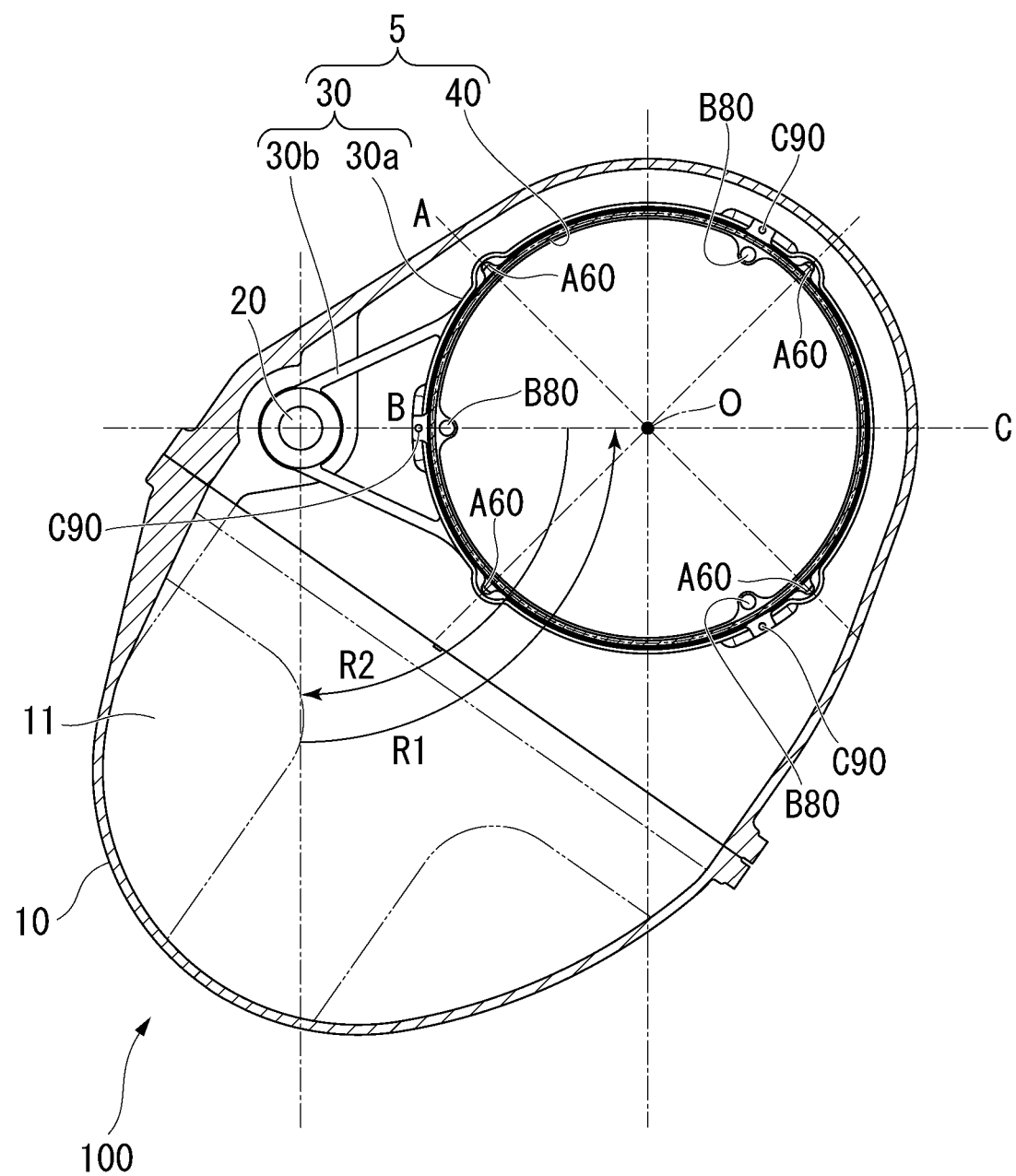
FIG. 1 is a horizontal cross-sectional view showing a configuration of a gate valve according to an embodiment of the present disclosure.

Hereinafter, a gate valve according to one or more embodiments the present disclosure will be described with reference to drawings.

In the drawings used for explanation described below, in order for the respective components to be of understandable size in the drawings, the dimensions and the proportions of the components are modified as needed compared with the real components.

The technical scope of the present disclosure is not limited to the embodiments which will be described below, but various modifications may be made without departing from the scope of the present disclosure.

In the embodiment, a movable valve A corresponds to a first movable valve of the present disclosure, and a movable valve B corresponds to a second movable valve. Additionally, a force-applying unit A corresponds to a first force-applying unit of the present disclosure, a force-applying unit B corresponds to a second force-applying unit of the invention, and a force-applying unit C corresponds to a third force-applying unit of the present disclosure.

Embodiment

FIG. 1 is a plan view showing a configuration of the gate valve according to the embodiment.

Figure 2:
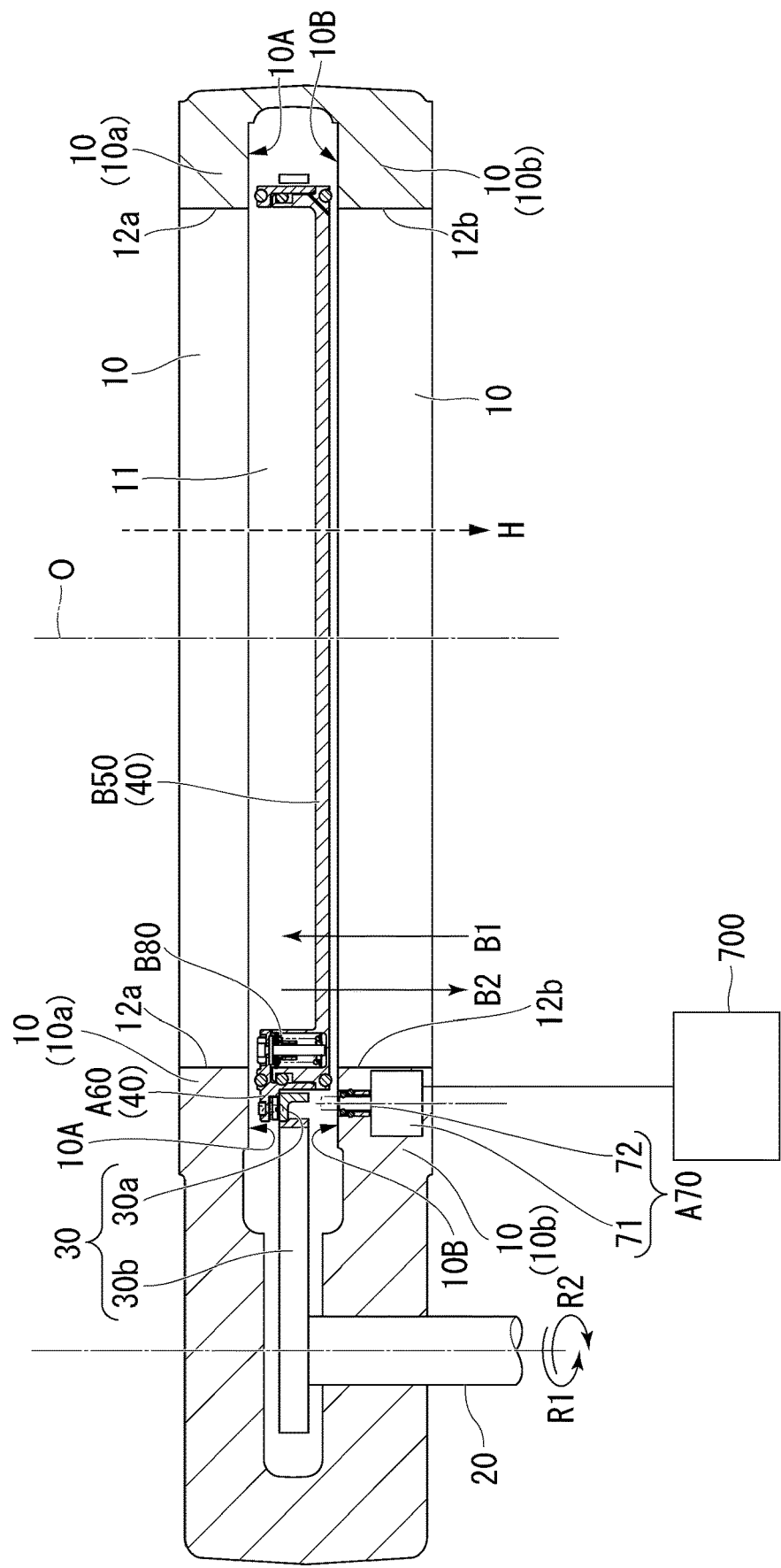
FIG. 2 is a vertical cross-sectional view showing the configuration of the gate valve according to the embodiment of the present disclosure and is a view showing a case where a valve body is disposed at a position (FREE) at which a retraction operation can be carried out.

FIG. 2 is a vertical cross-sectional view showing the configuration of the gate valve according to the embodiment and is a view showing a case where the valve body is disposed at a position (FREE) at which a retraction operation can be carried out. FIG. 2 corresponds to the line segment B-O-C shown in FIG. 1. Similar to FIG. 2, FIGS. 3 to 6 are views showing a case where the valve body is disposed at a position (FREE) at which a retraction operation can be carried out.

Figure 3:
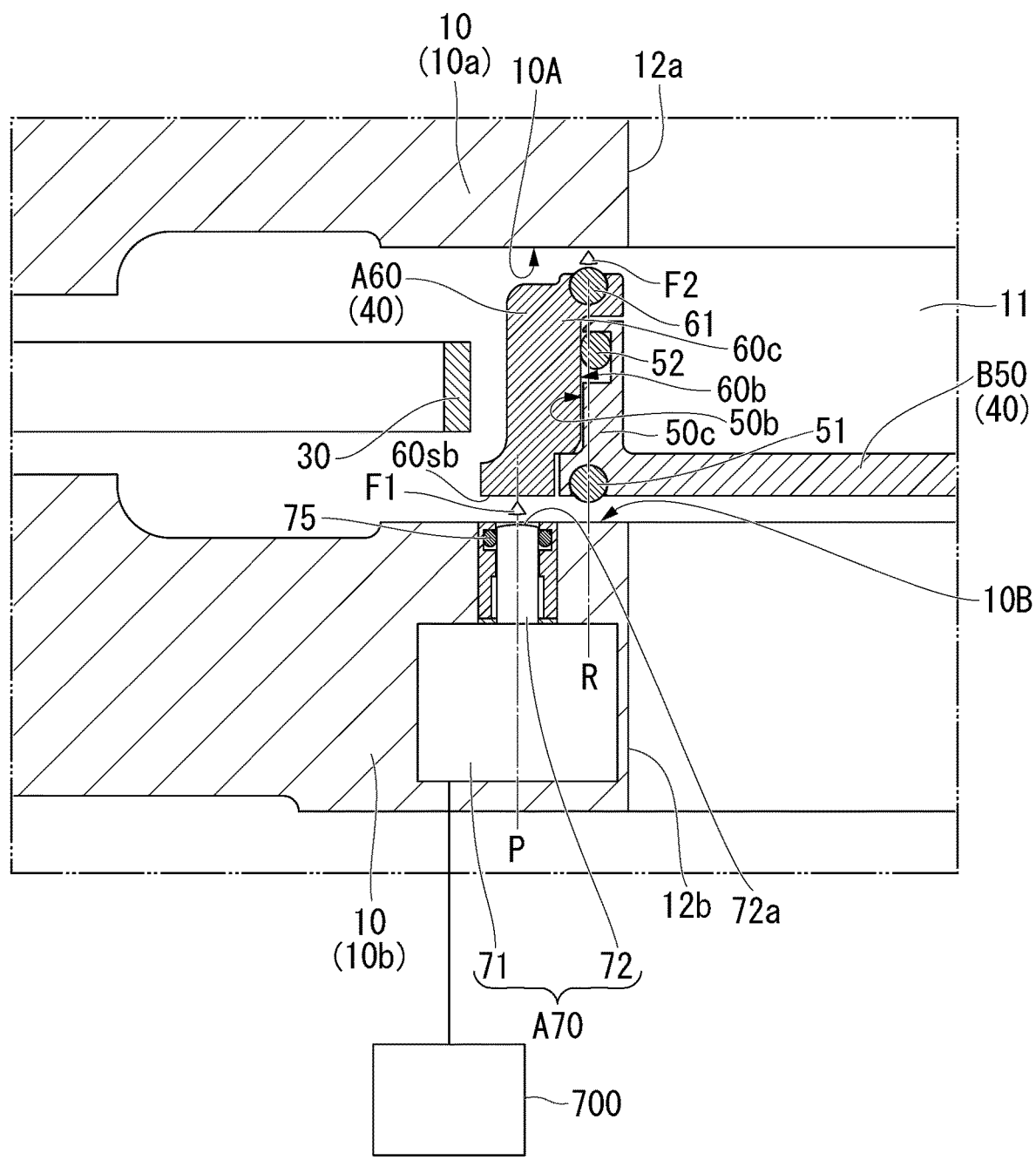
FIG. 3 is an enlarged view showing a relevant part taken along the line segment A-O shown in FIG. 1 and is a view showing a case where the valve body is disposed at a position (FREE) at which a retraction operation can be carried out.

FIG. 3 is an enlarged view showing a relevant part taken along the line segment A-O shown in FIG. 1 and is a view showing configurations of members located close to the force-applying unit A that is built in the valve box.

Figure 4:
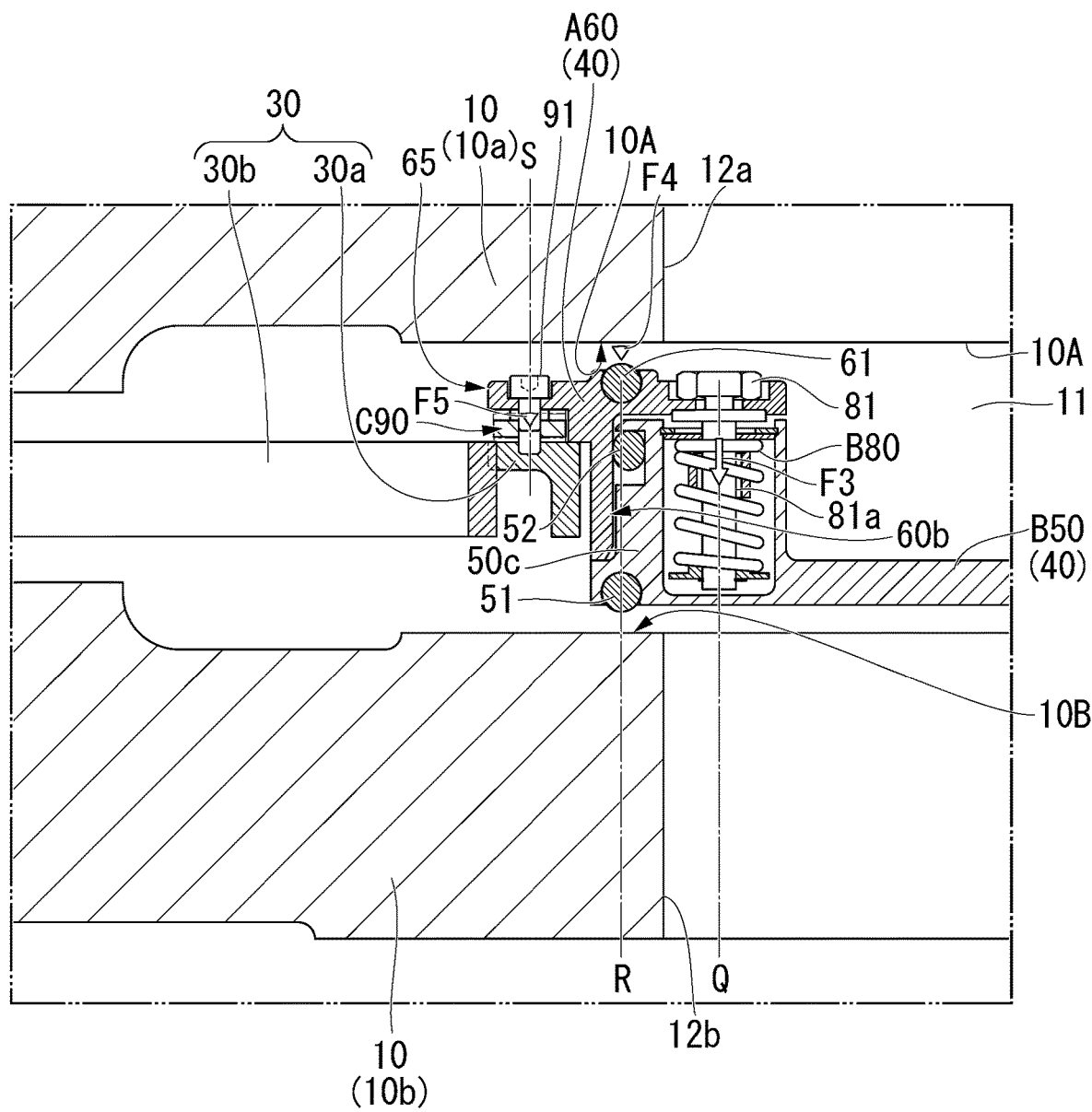
FIG. 4 is an enlarged view showing a relevant part taken along the line segment B-O shown in FIG. 1 and is a view showing a case where the valve body is disposed at a position (FREE) at which a retraction operation can be carried out.

FIG. 4 is an enlarged view showing a relevant part taken along the line segment B-O shown in FIG. 1 and is a view showing configurations of members located close to the force-applying unit B disposed between the movable valve A and the movable valve B.

Figure 5:
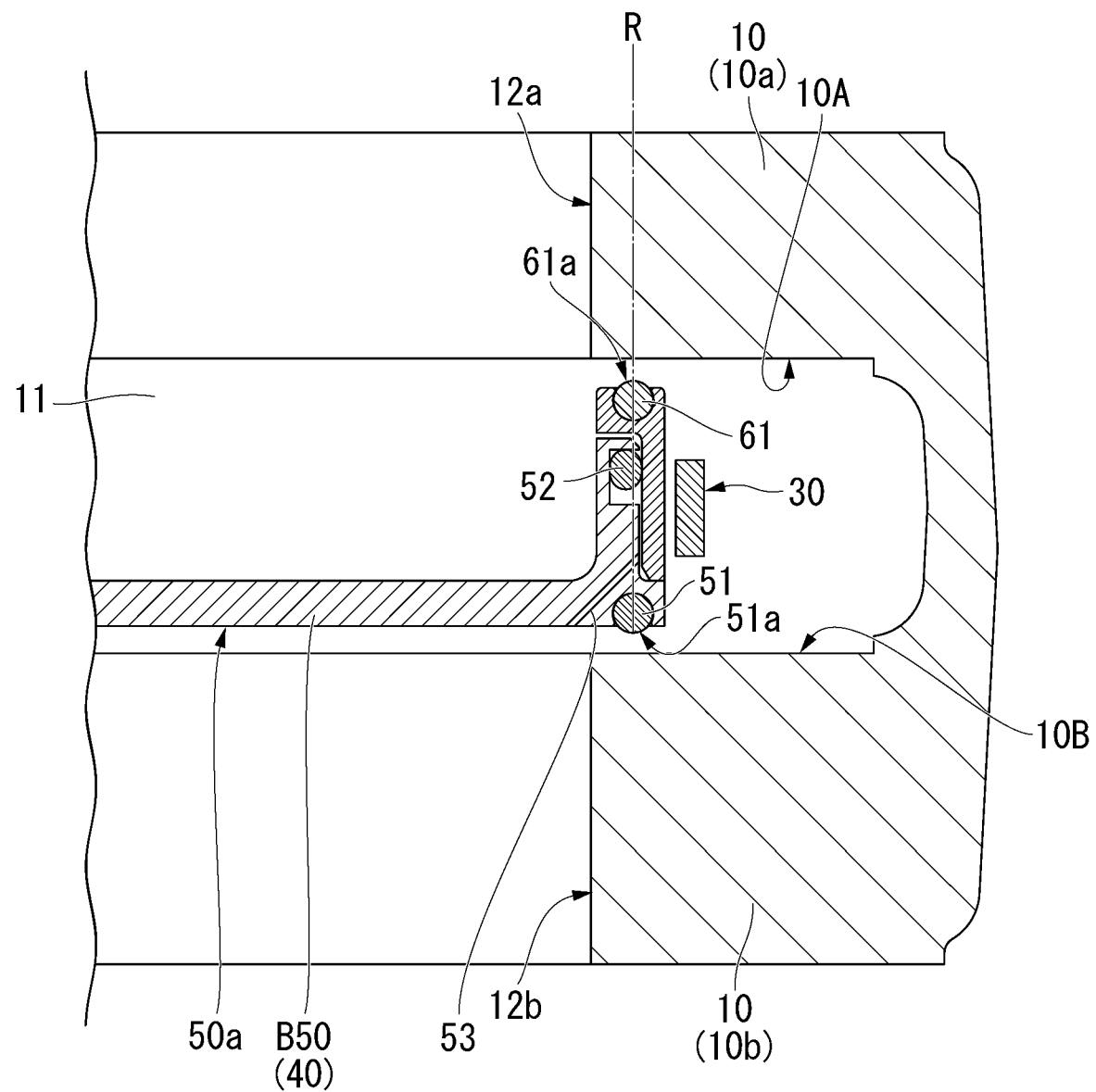
FIG. 5 is an enlarged view showing a relevant part taken along the line segment C-O shown in FIG. 1 and is a view showing a case where the valve body is disposed at a position (FREE) at which a retraction operation can be carried out.

FIG. 5 is an enlarged view showing a relevant part taken along the line segment C-O shown in FIG. 1 and is a view showing the movable valve A and the movable valve B at a position at which the force-applying unit A and the force-applying unit B are not present.

Figure 6:
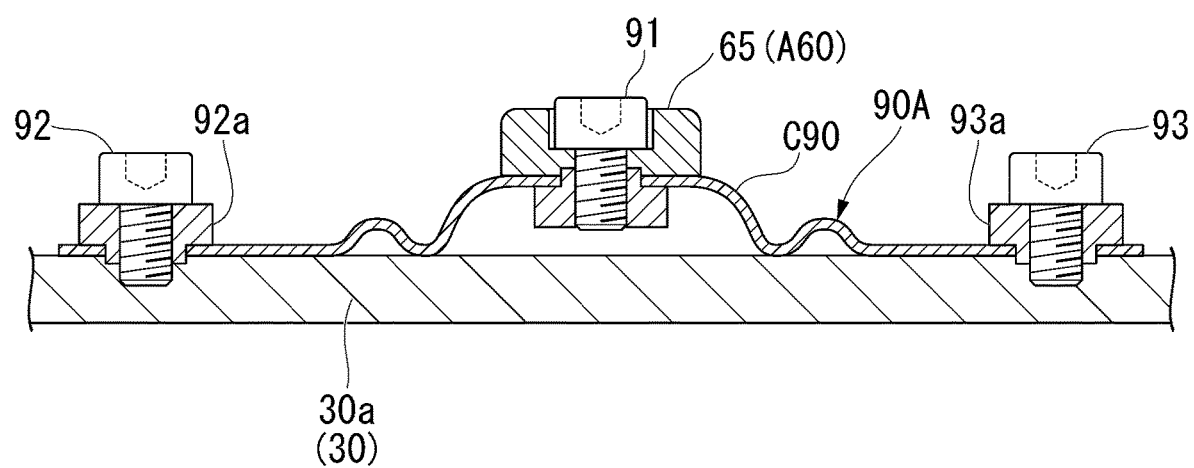
FIG. 6 is an enlarged view showing a relevant part of a force-applying unit C shown in FIG. 2 and is a view showing a case where the valve body is disposed at a position (FREE) at which a retraction operation can be carried out.

FIG. 6 is an enlarged view showing a relevant part of the force-applying unit C shown in FIG. 1 and is a view showing the force-applying unit C as seen in the paperface depth direction in FIG. 2.

Figure 7:
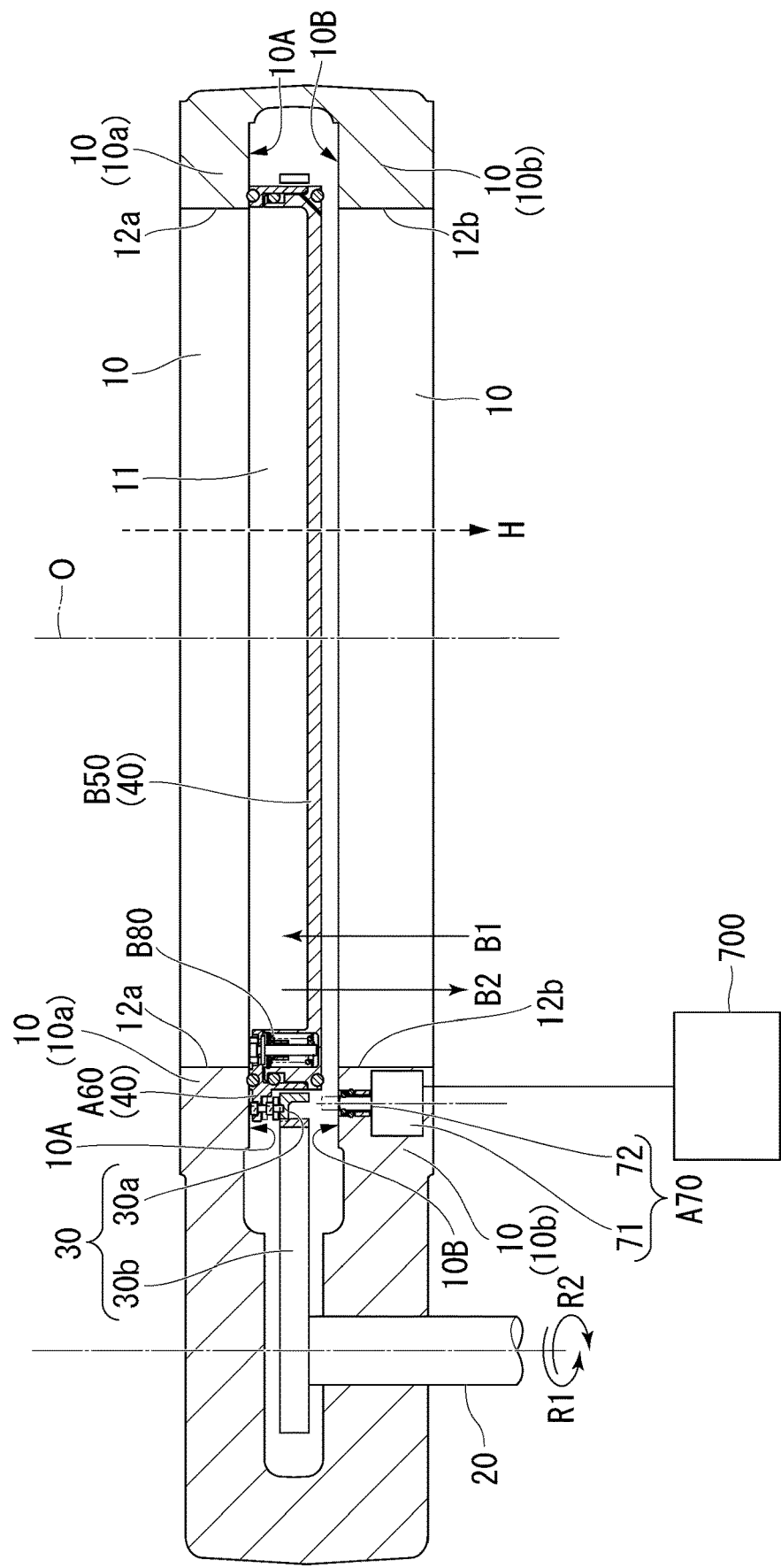
FIG. 7 is a vertical cross-sectional view showing the configuration of the gate valve according to the embodiment of the present disclosure and is a view showing a case where the valve body is disposed at a valve closing position (positive pressure or non-differential pressure).

FIG. 7 is a vertical cross-sectional view showing the configuration of the gate valve according to the embodiment and is a view showing a case where the valve body is disposed at a valve closing position (positive pressure or non-differential pressure). FIG. 7 corresponds the line segment B-O-C shown in FIG. 1. Similar to FIG. 7, FIGS. 8 to 11 are views showing a case where the valve body is disposed at a valve closing position (positive pressure or non-differential pressure).

Figure 8:
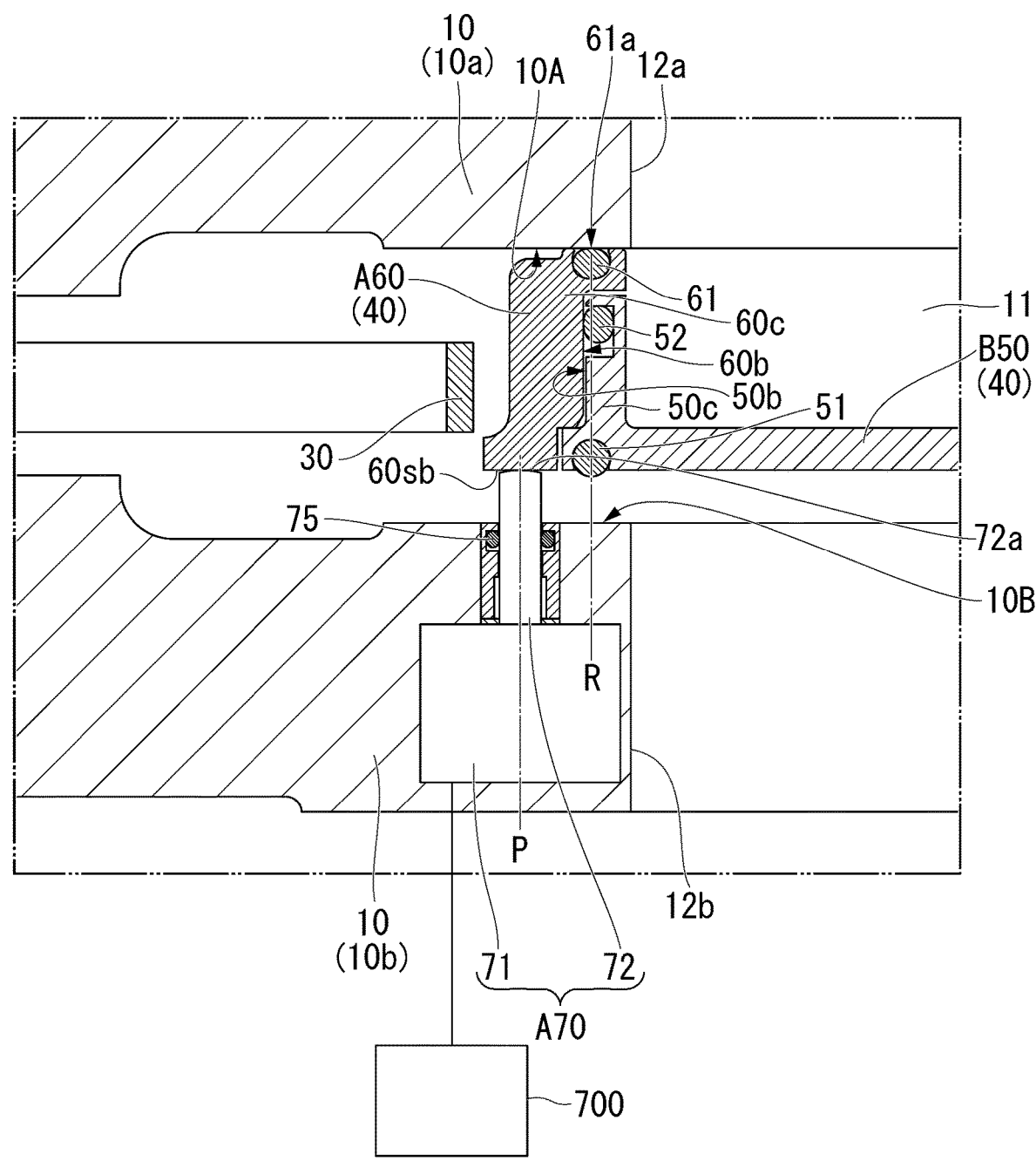
FIG. 8 is an enlarged view showing a relevant part taken along the line segment A-O shown in FIG. 1 and is a view showing a case where the valve body is disposed at a valve closing position (positive pressure or non-differential pressure).

FIG. 8 is an enlarged view showing a relevant part taken along the line segment A-O shown in FIG. 1 and is a view showing configurations of members located close to the force-applying unit A that is built in the valve box.

Figure 9:
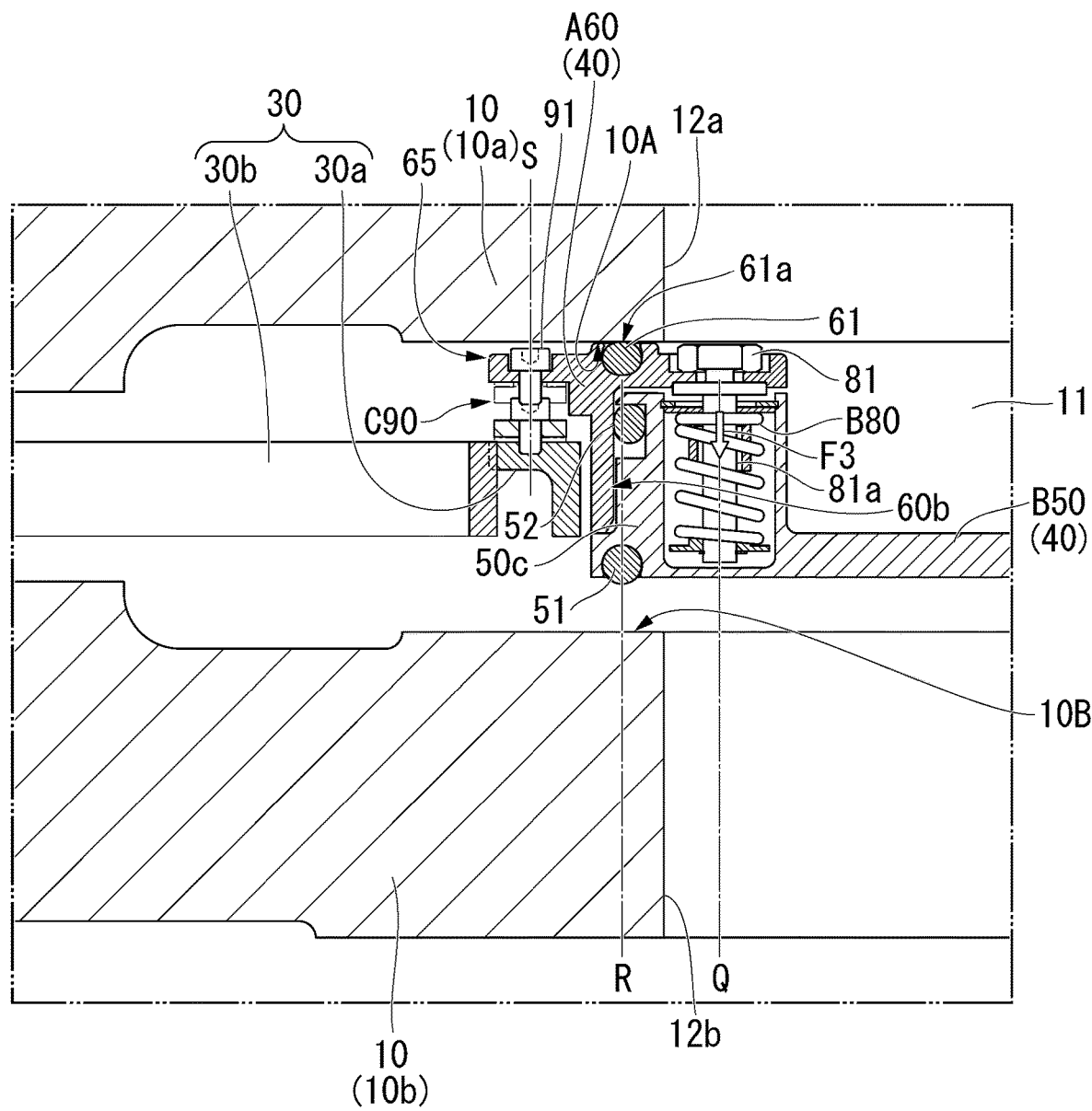
FIG. 9 is an enlarged view showing a relevant part taken along the line segment B-O shown in FIG. 1 and is a view showing a case where the valve body is disposed at a valve closing position (positive pressure or non-differential pressure).

FIG. 9 is an enlarged view showing a relevant part taken along the line segment B-O shown in FIG. 1 and is a view showing configurations of members located close to the force-applying unit B disposed between the movable valve A and the movable valve B.

Figure 10:
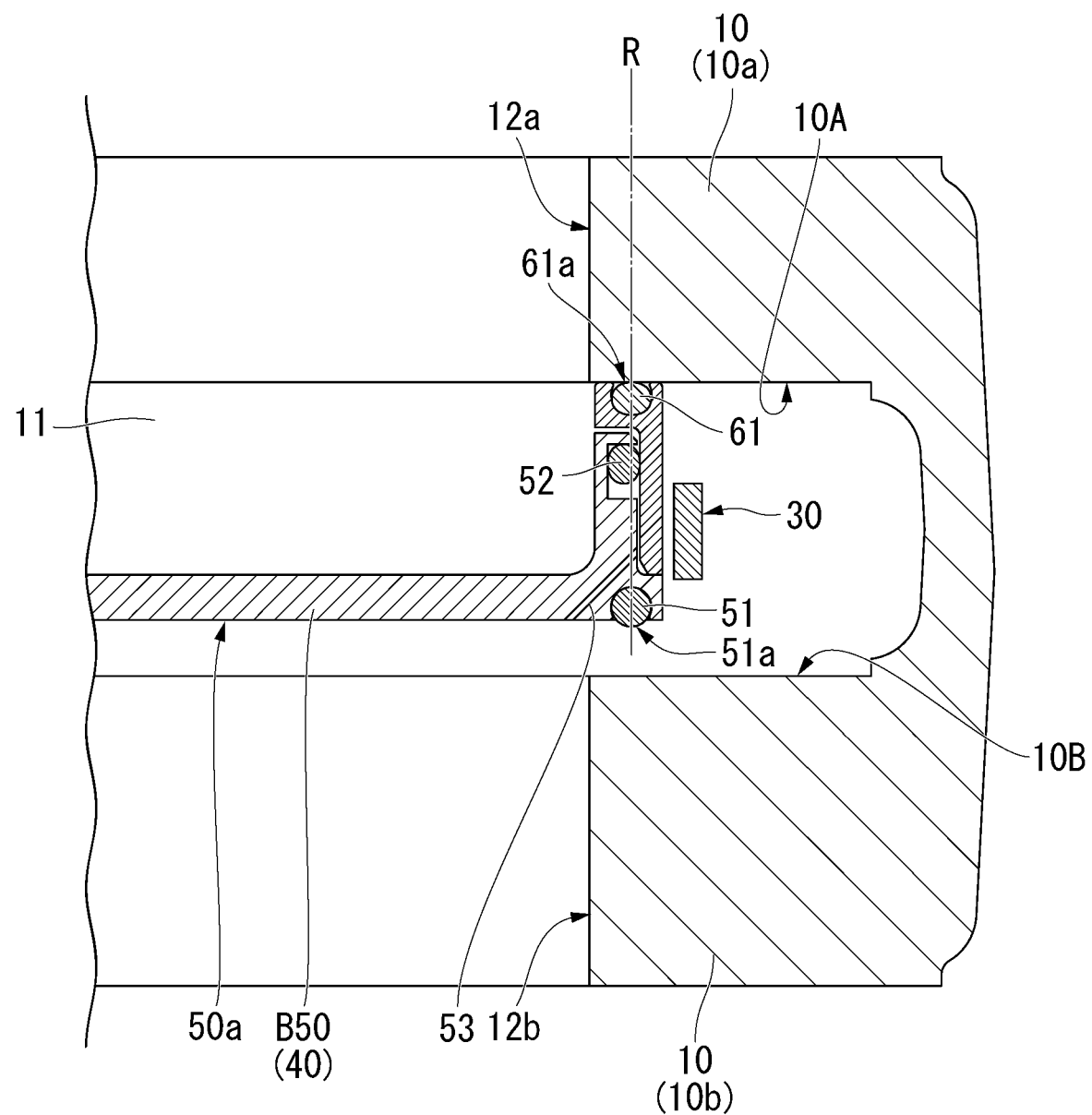
FIG. 10 is an enlarged view showing a relevant part taken along the line segment C-O shown in FIG. 1 and is a view showing a case where the valve body is disposed at a valve closing position (positive pressure or non-differential pressure).

FIG. 10 is an enlarged view showing a relevant part taken along the line segment C-O shown in FIG. 1 and is a view showing the movable valve A and the movable valve B at a position at which the force-applying unit A and the force-applying unit B are not present.

Figure 11:
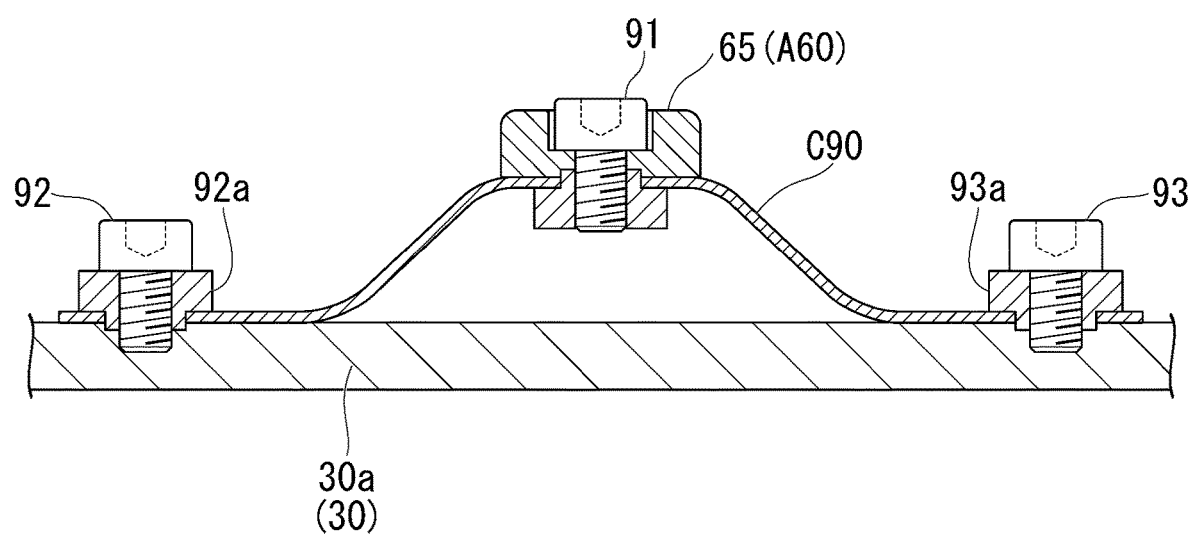
FIG. 11 is an enlarged view showing a relevant part of a force-applying unit C shown in FIG. 7 and is a view showing a case where the valve body is disposed at a valve closing position (positive pressure or non-differential pressure).

FIG. 11 is an enlarged view showing a relevant part of the force-applying unit C shown in FIG. 1 and is a view showing the force-applying unit C as seen in the paperface depth direction in FIG. 7.

Figure 12:
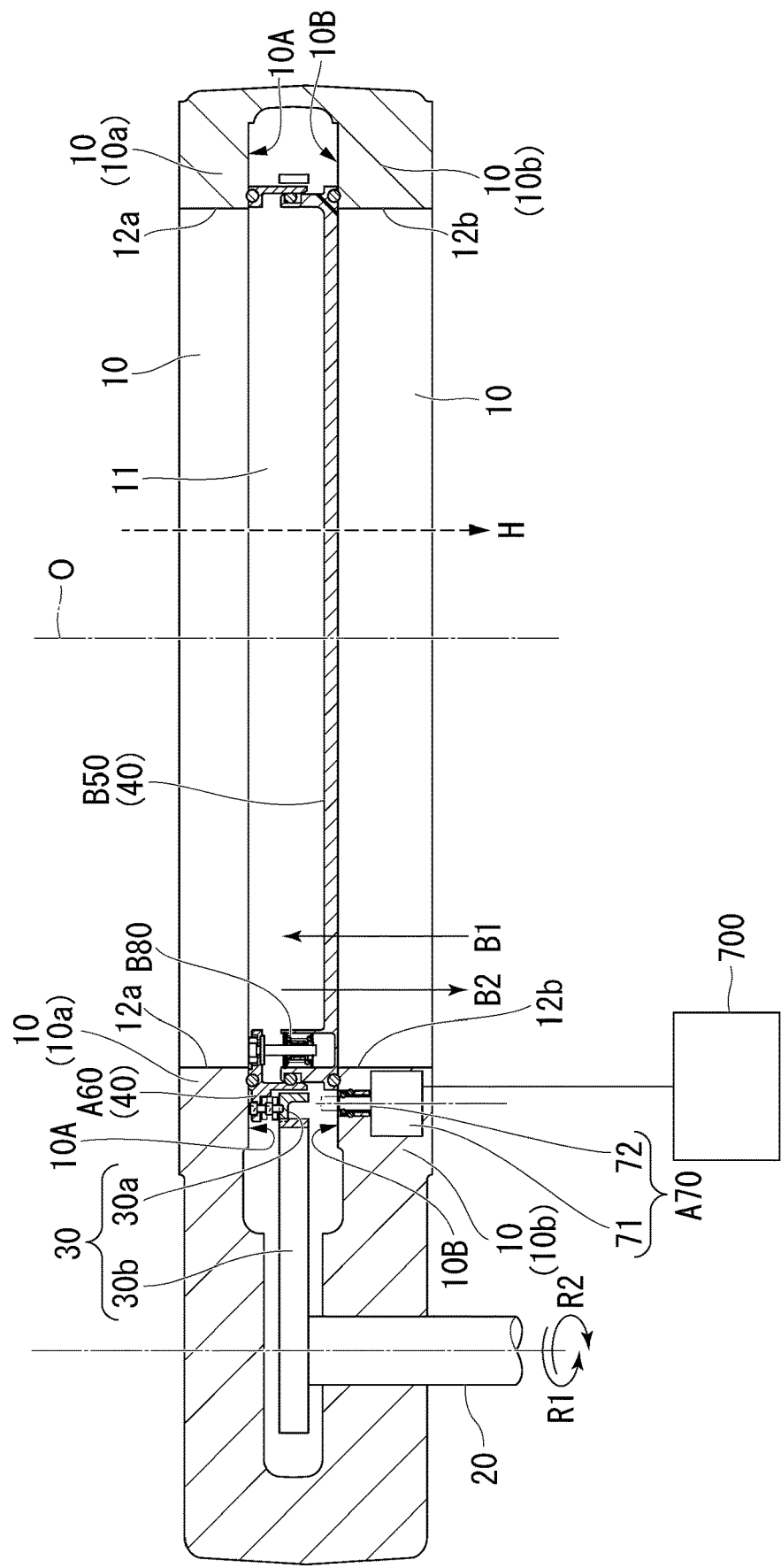
FIG. 12 is a vertical cross-sectional view showing the configuration of the gate valve according to the embodiment of the present disclosure and is a view showing a case where the valve body is disposed at a back pressure position.

FIG. 12 is a vertical cross-sectional view showing the configuration of the gate valve according to the embodiment and is a view showing a case where the valve body is disposed at a back pressure position. FIG. 12 corresponds the line segment B-O-C shown in FIG. 1. Similar to FIG. 12, FIGS. 13 to 15 are views showing a case where the valve body is disposed at a back pressure position.

Figure 13:
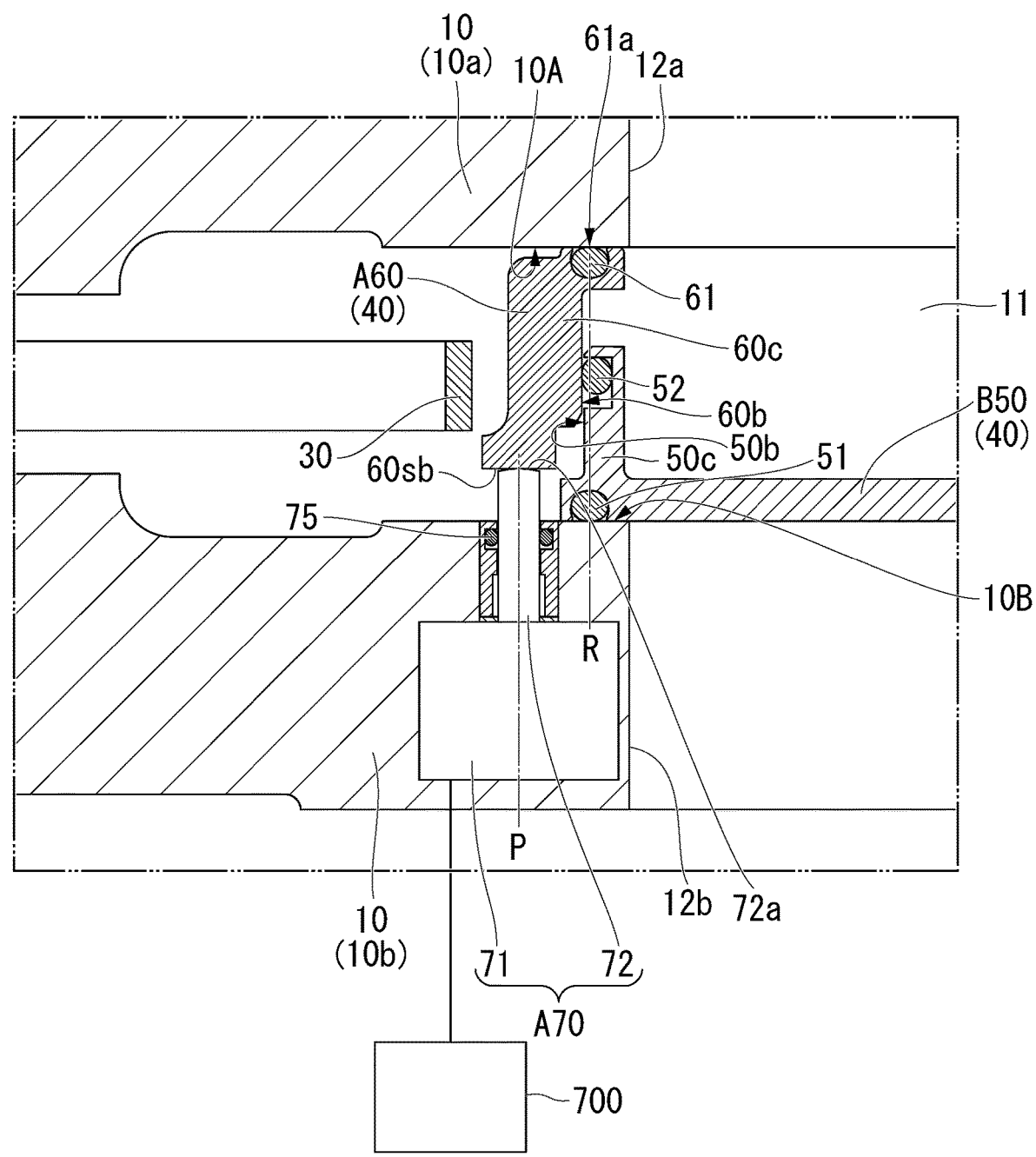
FIG. 13 is an enlarged view showing a relevant part taken along the line segment A-O shown in FIG. 1 and is a view showing a case where the valve body is disposed at a back pressure position.

FIG. 13 is an enlarged view showing a relevant portion taken along the line segment A-O shown in FIG. 1 and is a view showing configurations of members located close to the force-applying unit A that is built in the valve box.

Figure 14:
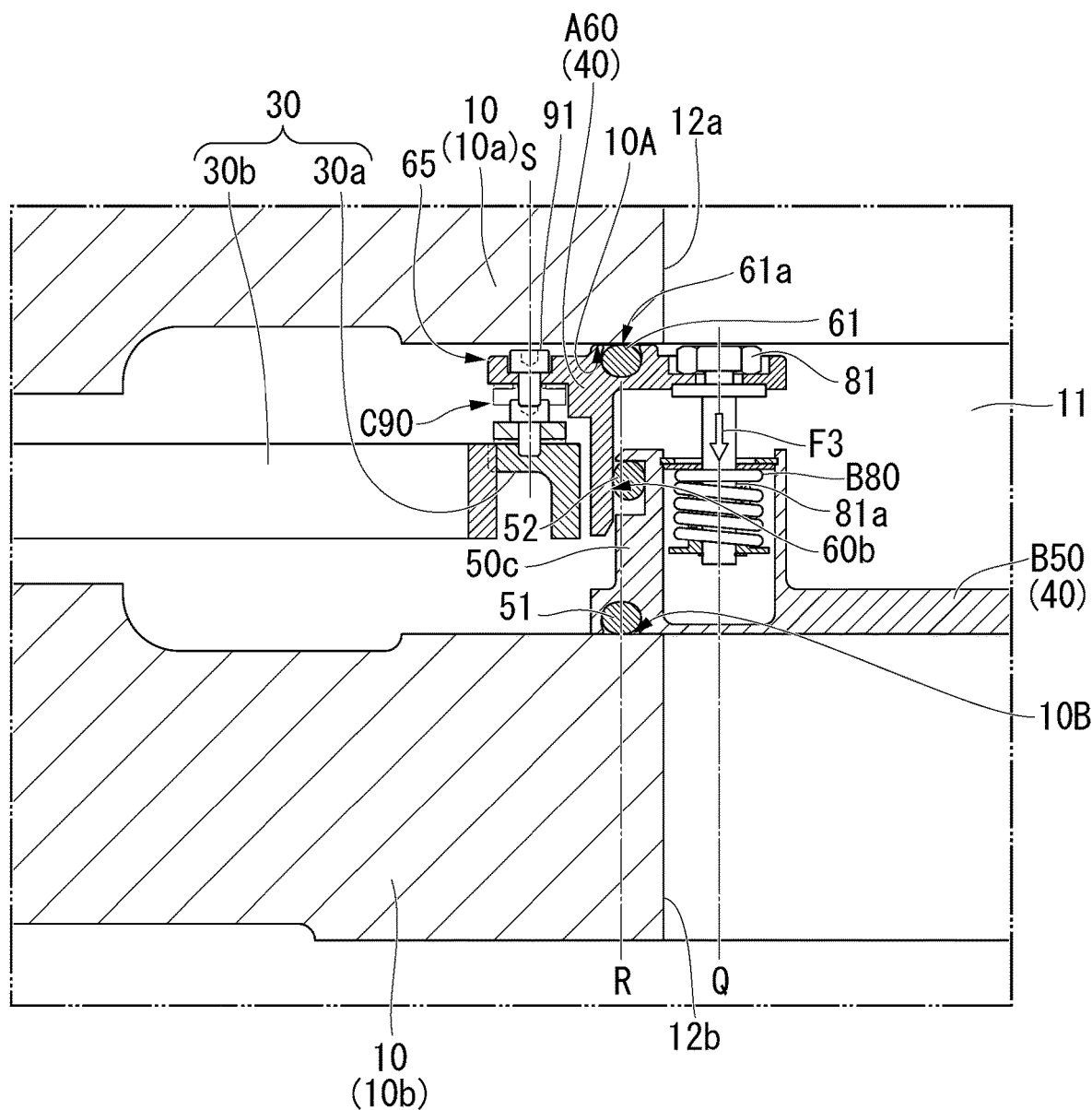
FIG. 14 is an enlarged view showing a relevant part taken along the line segment B-O shown in FIG. 1 and is a view showing a case where the valve body is disposed at a back pressure position.

FIG. 14 is an enlarged view showing a relevant part taken along the line segment B-O shown in FIG. 1 and is a view showing configurations of members located close to the force-applying unit B disposed between the movable valve A and the movable valve B.

Figure 15:
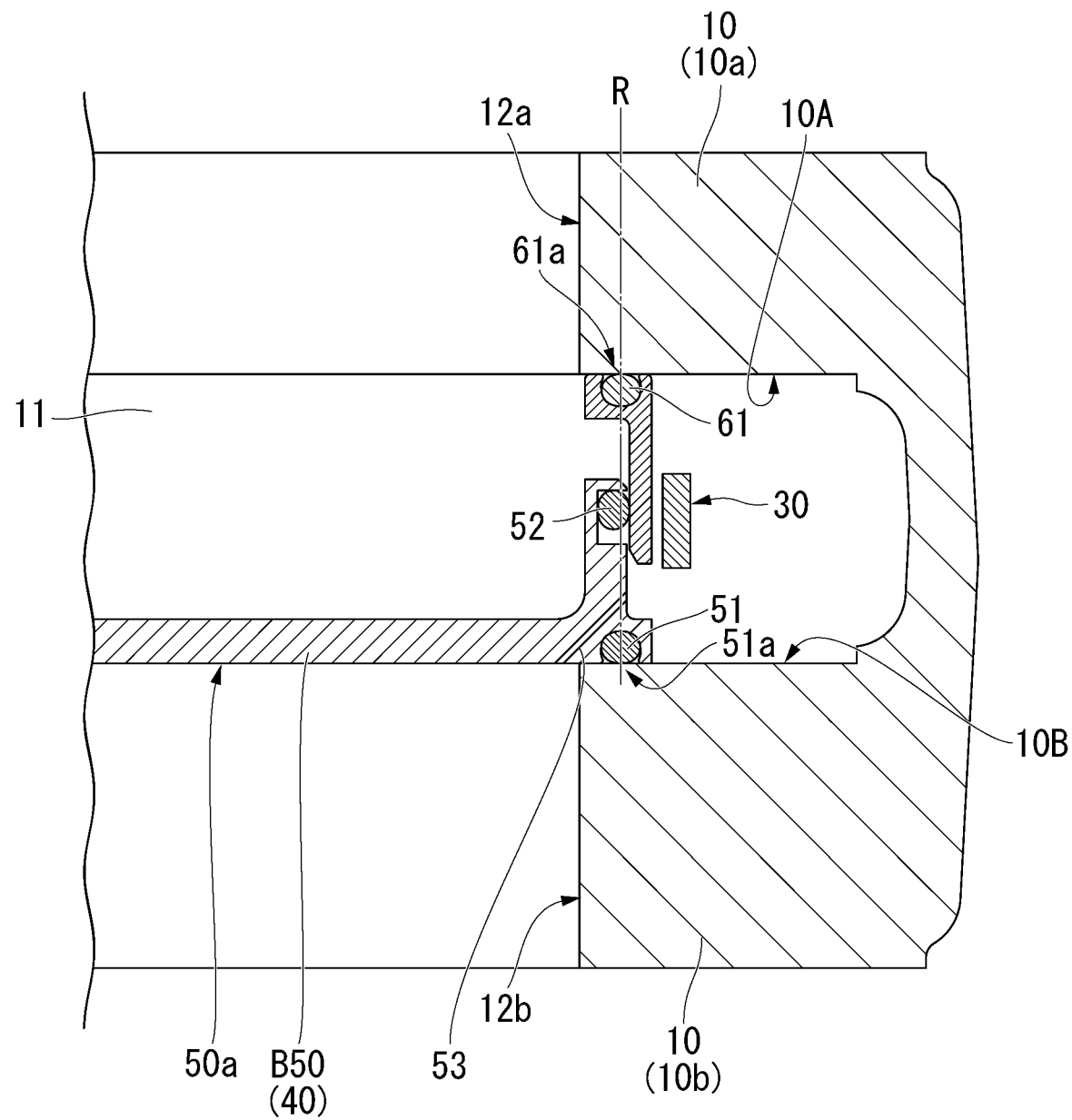
FIG. 15 is an enlarged view showing a relevant part taken along the line segment C-O shown in FIG. 1 and is a view showing a case where the valve body is disposed at a back pressure position.

FIG. 15 is an enlarged view showing a relevant part taken along the line segment C-O shown in FIG. 1 and is a view showing the movable valve A and the movable valve B at a position at which the force-applying unit A and the force-applying unit B are not present.

Figure 23:
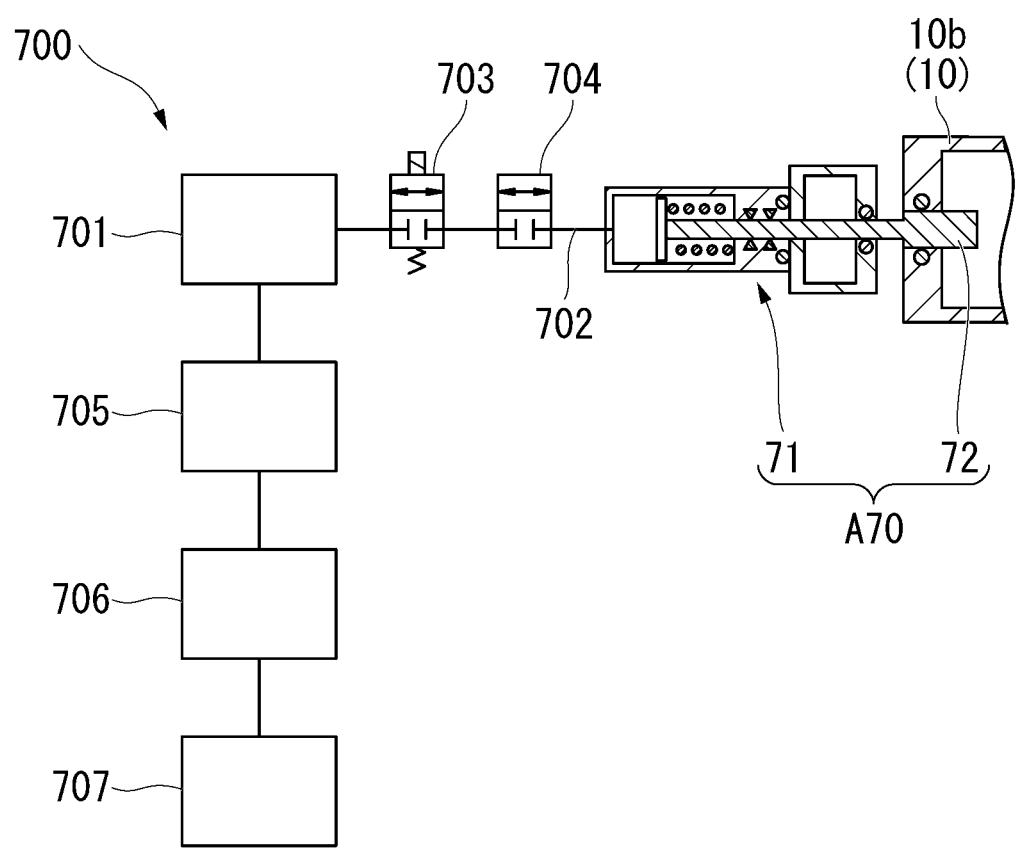
FIG. 23 is an explanatory schematic diagram showing a hydraulic driver and a first force-applying unit of the gate valve according to the embodiment of the present disclosure.

FIG. 23 is an explanatory schematic diagram showing a hydraulic driver and the force-applying unit A shown in FIG. 2.

Figure 24:
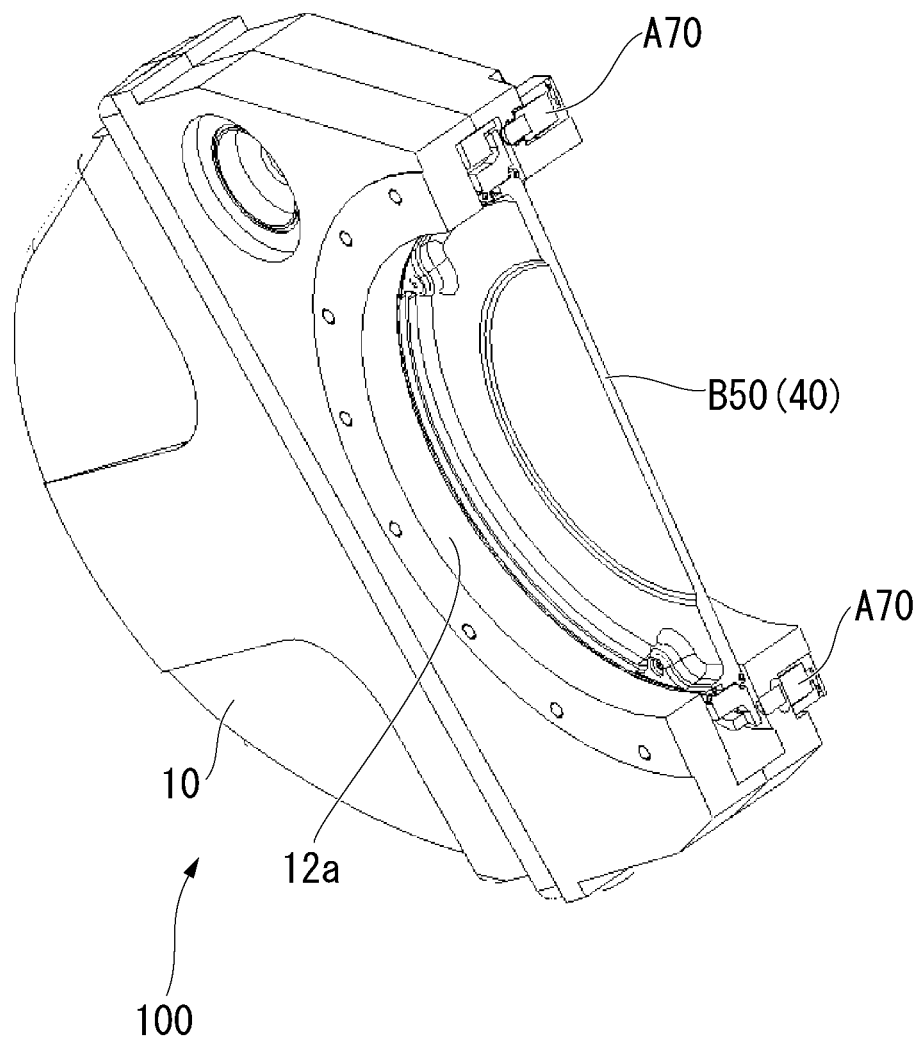
FIG. 24 is an explanatory perspective view showing an arrangement of the first force-applying units of the gate valve according to the embodiment of the present disclosure.

FIG. 24 is an explanatory perspective view showing an arrangement of the force-applying units A shown in FIG. 2.

Figure 25:
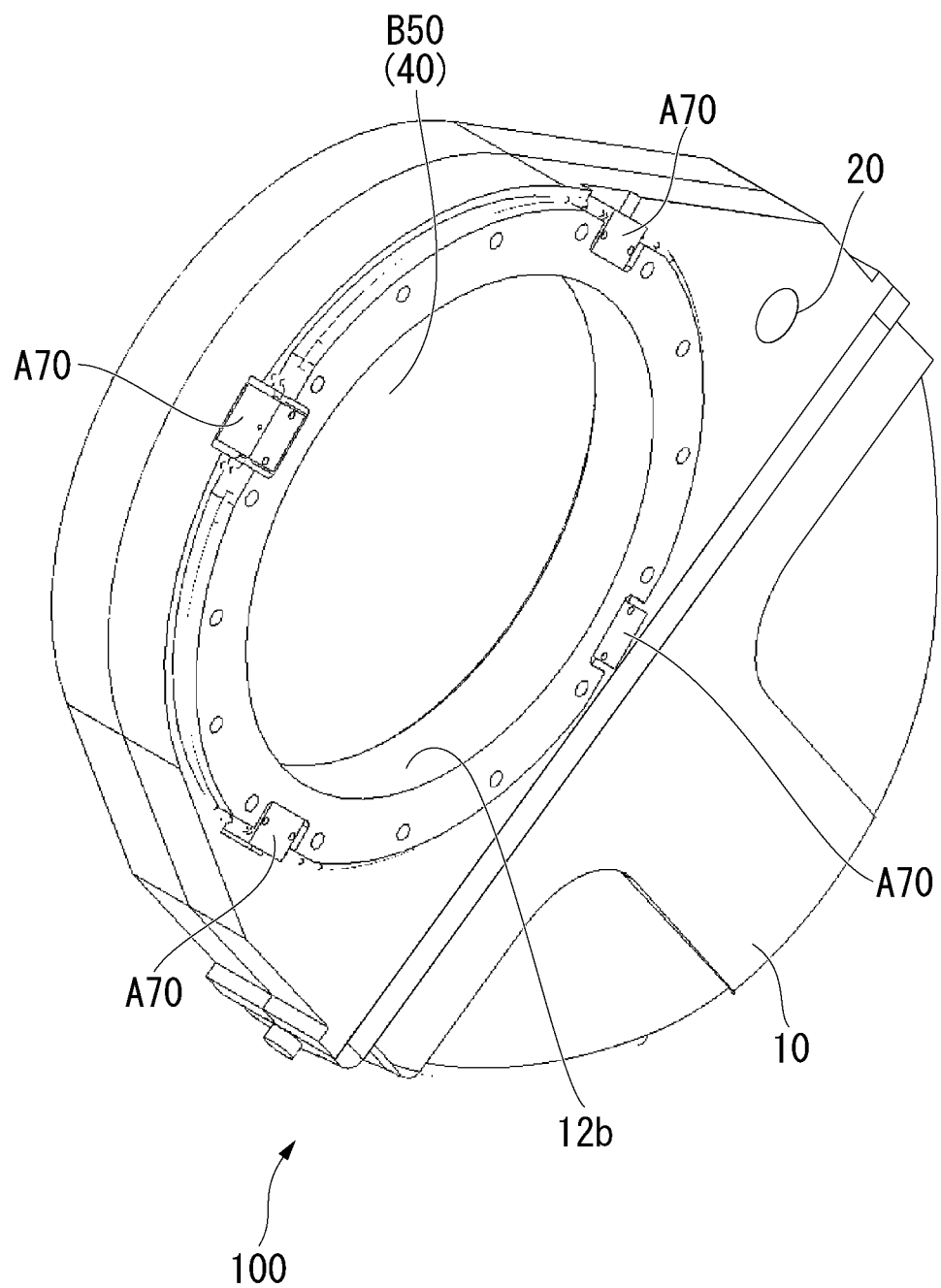
FIG. 25 is an explanatory perspective view showing an arrangement of the first force-applying units of the gate valve according to the embodiment of the present disclosure.

FIG. 25 is an explanatory perspective view showing an arrangement of the force-applying units A shown in FIG. 2.

Figure 26:
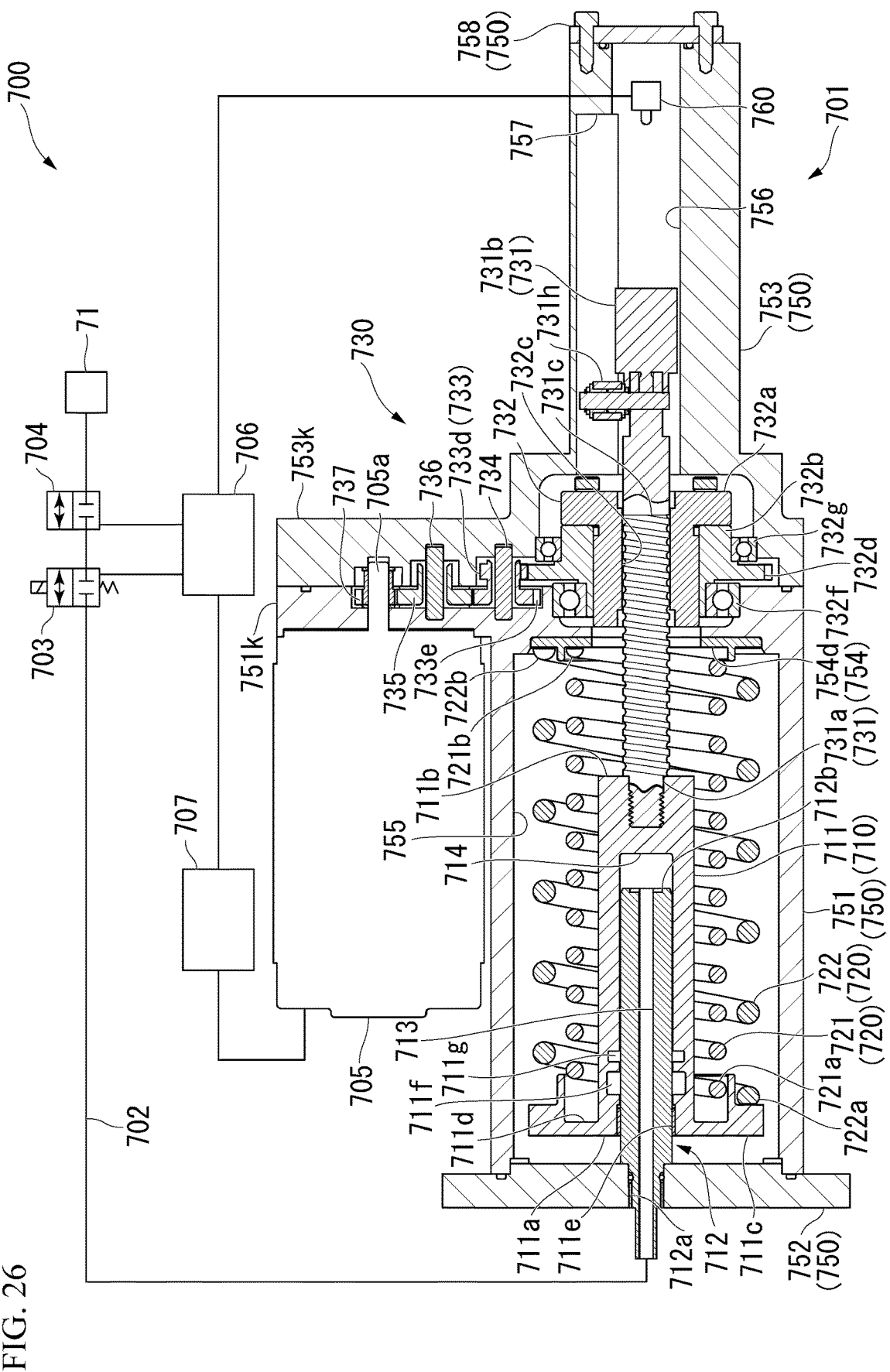
FIG. 26 is a cross-sectional view showing a hydraulic pressure generator of the hydraulic driver of the gate valve according to the embodiment of the present disclosure.
Figure 27:
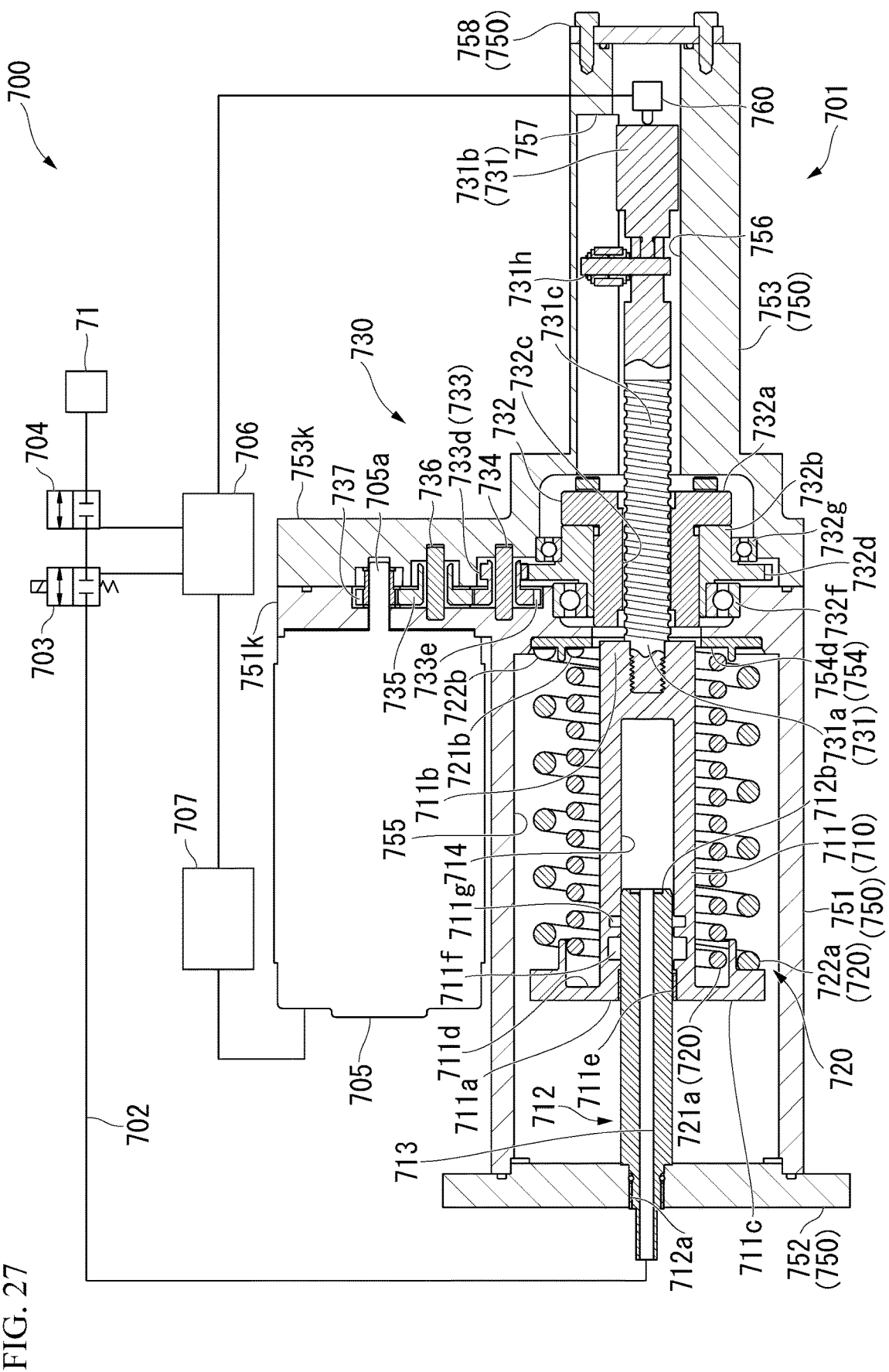
FIG. 27 is a cross-sectional view showing the hydraulic pressure generator of the hydraulic driver of the gate valve according to the embodiment of the present disclosure.
Figure 28:
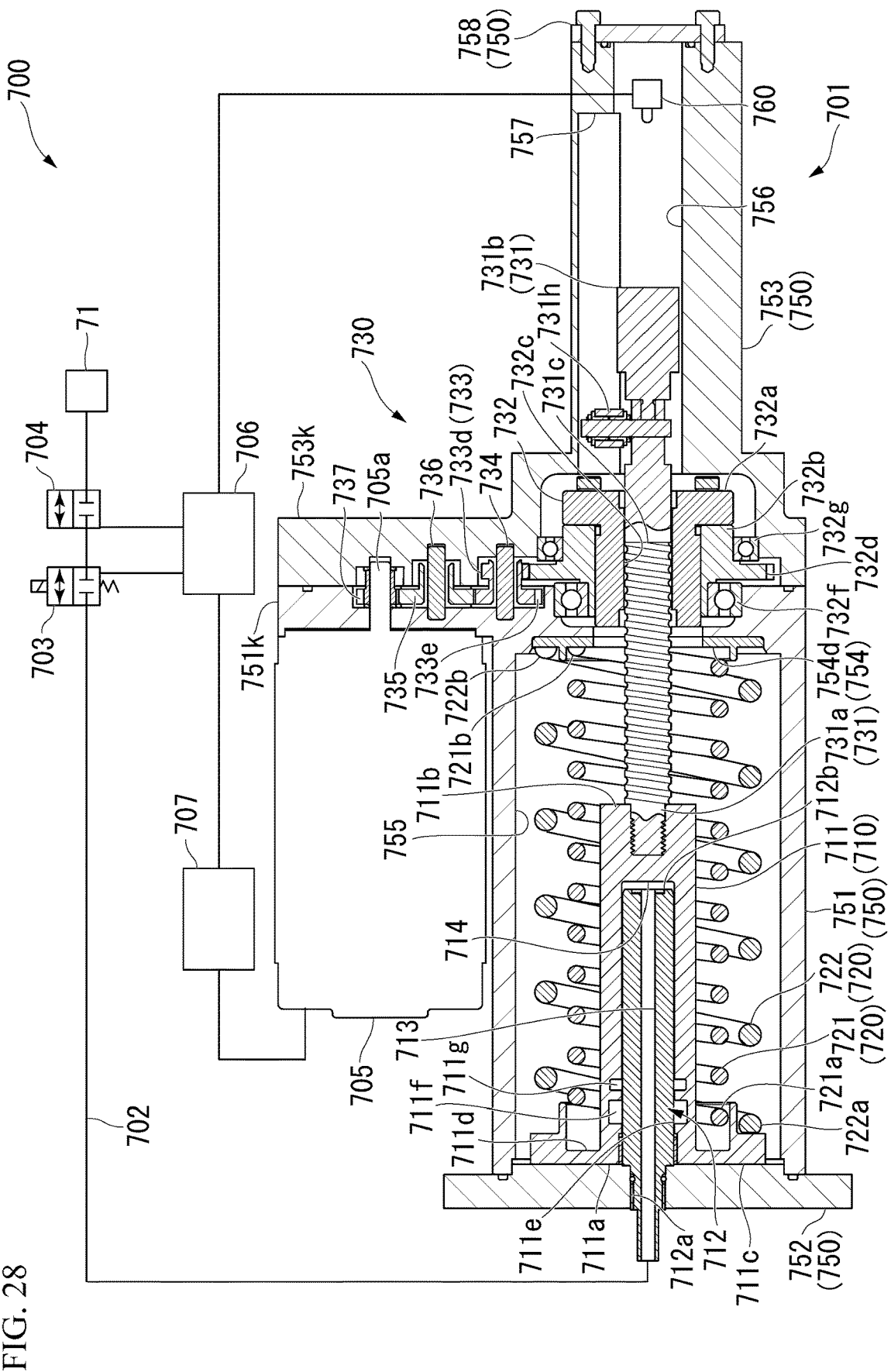
FIG. 28 is a cross-sectional view showing the hydraulic pressure generator of the hydraulic driver of the gate valve according to the embodiment of the present disclosure.

FIGS. 26 to 28 are cross-sectional views showing the hydraulic driver shown in FIG. 2.

(Pendulum Gate Valve)

As shown in FIGS. 1 to 15, a gate valve 100 according to one or more embodiments of the present disclosure is a pendulum gate valve.

The gate valve 100 includes: a hollow portion 11; a valve box 10 having a first opening portion 12a and a second opening portion 12b which face each other so as to sandwich the hollow portion 11 therebetween and form a flow passage communicating the hollow portion 11; and a neutral valve body 5 that is disposed inside the hollow portion 11 of the valve box 10 and can seal the first opening portion 12a.

A flow passage H is set so as to be directed from the first opening portion 12a to the second opening portion 12b. Note that, in the following explanation, the direction along the flow passage H will be referred to as a flow passage direction H.

The gate valve 100 functions as a position switcher that drives the neutral valve body 5 between: a valve sealing position at which the neutral valve body 5 is in a state of sealing the first opening portion 12a (FIG. 7); and a valve opening position at which the neutral valve body 5 is in an open state of being retracted from the first opening portion 12a (FIG. 2). In addition, the gate valve 100 includes a rotation shaft 20 having an axis line extending in the flow passage direction H.

The neutral valve body 5 is configured to include: a neutral valve 30 that is connected to the position switcher (neutral valve body 5); and a movable valve 40 that is connected to the neutral valve 30 so that the position thereof with respect to the neutral valve in the flow passage direction H is changeable.

The movable valve 40 includes a movable valve A 60 (movable valve frame) and a movable valve B 50 (movable valve plate). A first seal portion 61 that is circumferentially provided on the movable valve A and is to be in close contact with the inner surface of the valve box 10 located around the first opening portion 12a is provided on the movable valve A60 (movable valve frame). The movable valve B50 (movable valve plate) is slidable relative to the movable valve A60 (movable valve frame) in the flow passage direction H.

A plurality of force-applying units A70 (a piston corresponding to a previous main spring) are built in the valve box 10. The force-applying unit A70 disposed inside the valve box 10 constitutes a lifting and lowering mechanism that presses the movable valve A60 in a direction toward a sealing face and can extend and contract. The force-applying unit A70 is connected to a hydraulic driver (incompressible-fluid driver) 700 and is driven by a hydraulic pressure.

Consequently, the force-applying unit A70 has a function of applying a force to the movable valve A60 in the flow passage direction H toward the first opening portion 12a and thereby causing the first seal portion 61 to be in close contact with the inner surface of the valve box 10 located around the first opening portion 12a.

In addition, the gate valve according to one or more embodiments of the present disclosure includes the force-applying unit C that connects the movable valve A to the neutral valve so that the position thereof with respect to the neutral valve in the flow passage direction is changeable and applies a force to the movable valve A to be directed to a center position in the flow passage direction.

Furthermore, the gate valve according to one or more embodiments of the present disclosure includes the force-applying unit A that constitutes the lifting and lowering mechanism that presses the movable valve A in the direction toward the sealing face of a valve box inner surface 10A and can extend and contract in the valve box.

According to this configuration, since the structure is obtained in which the valve body is configured to include two movable valves A and B and one force-applying unit B and the structure is obtained in which another force-applying unit A is built in the valve box, weight saving of the valve structure by the weight of the force-applying unit A is achieved. In the gate valve according to the embodiment of the present disclosure, the force-applying unit A works in the case where the gate valve becomes the valve closed state (FIG. 7) from the valve opened state (FIG. 2); reversely, the force-applying unit C works in the case where the gate valve becomes the valve opened state (FIG. 2) from the valve closed state (FIG. 7).

The force-applying unit B (a spring corresponding to a previous air cylinder) is disposed (built in the movable valve) between the movable valve A60 (movable valve frame) and the movable valve B50 (movable valve plate). The force-applying unit B drives the movable valve A60 (movable valve frame) and the movable valve B (movable valve plate) so that the thicknesses thereof in the flow passage direction H are adjustable.

When the rotation shaft 20 rotates in a direction represented by reference numeral R1 (in the direction intersecting with the direction of the flow passage H), in accordance with this rotation, the neutral valve 30 that is fixed to the rotation shaft 20 with a connection member (not shown in the figure) interposed therebetween also rotates in a direction R1. Additionally, since the movable valve 40 is connected to the neutral valve 30 so as to be slidable relative to the neutral valve only in the thickness direction, the movable valve 40 rotates integrally with the neutral valve 30.

As the neutral valve 30 rotates in the above-described manner, the movable valve 40 moves in pendulum motion from a safety position corresponding to the hollow portion 11 in which the flow passage H is not provided to a valve closing position of the of the flow passage H which is a position corresponding to the first opening portion 12a.

Furthermore, the force-applying unit A70 built in the valve box 10 is configured of: a hydraulic pressure drive unit (fixed portion) 71 that is disposed inside the valve box 10 and can be driven by a hydraulic pressure (pressurized incompressible fluid) supplied from the hydraulic driver 700; and a movable portion 72 that can extend and contract in a direction from the fixed portion 71 toward the movable valve A60 by the hydraulic pressure drive unit (fixed portion) 71.

Additionally, a ring-shaped seal member (O-ring) 75 is provided around the movable portion 72 and at a front-end side position of the movable portion 72. The movable portion 72 is extendable in a state where the movable portion 72 is sealed so that a vacuum side (vacuum space) in which the movable valve A60 is disposed is isolated from the hydraulic pressure drive unit (fixed portion) 71 by the seal member 75.

Accordingly, the force-applying unit A70 has a function of causing the front-end portion of the force-applying unit A70 to come into contact with the movable valve A60 by a hydraulic pressure and thereby moving the movable valve A60 toward the first opening portion 12a.

As the force-applying unit A70 has a function of causing the movable valve A60 to move toward the first opening portion 12a, the movable valve A60 comes into contact with the inner surface of the valve box 10, the movable valve A60 is pressed against the inner surface of the valve box 10, the flow passage H is closed (valve closing operation).

Reversely, as a force-applying unit C90 has a function of separating the movable valve A60 from the first opening portion 12a, the movable valve A60 is separated from the inner surface of the valve box 10, thereafter the movable valve A60 is retracted, and the flow passage H is opened (release operation).

The valve closing operation and the release operation are possible due to mechanical contact operation using the force-applying unit A70 that causes the movable valve A60 to come into contact with the inner surface of the valve box 10 and due to mechanical separation operation using the force-applying unit C90 that separates the movable valve A60 from the inner surface of the valve box 10.

After the release operation, when the rotation shaft 20 rotates in a direction represented by reference numeral R2 (retraction operation), in accordance with this rotation, the neutral valve 30 and the movable valve 40 (that is, the movable valve A60 and the movable valve B50) also rotate in the direction R2.

Moreover, the force-applying unit B that drives the movable valve A60 and the movable valve B50 so that the thicknesses thereof in the flow passage direction H are adjustable is disposed between the movable valve A and the movable valve B. That is, the force-applying unit B is built in the movable valve. As the force-applying unit B exists, the movable valve A and the movable valve B cooperatively work in a series of operations (valve closing operation, release operation, and retraction operation).

By the release operation and the retraction operation, valve opening operation is carried out in which the movable valve 40 retracts from the aforementioned valve opening-closing position to the aforementioned safety position and is in a valve open state.

As stated above, in the gate valve according to one or more embodiments of the present disclosure, the structure is obtained in which the valve body is configured to include: two of the movable valve A60 and the movable valve B50; and two of the force-applying unit B80 and the force-applying unit C90 and in which another force-applying unit A is built in the valve box. That is, in the embodiment of the present disclosure, weight saving of the valve body by the weight of another force-applying unit A built in the valve box is achieved.

As a result, in the embodiment of the present disclosure, it is possible to provide a gate valve that can carry out isolation operation with a high degree of reliability, achieves a weight saving of a movable valve, and can realize 100% of a back pressure cancellation rate.

(Valve Box 10)

The valve box 10 is configured to include a frame having a hollow portion 11. The first opening portion 12a is provided on the upper face of the frame shown in figure, and the second opening portion 12b is provided on the lower face of the frame shown in figure.

The gate valve 100 is to be inserted between a space (first space) to which the first opening portion 12a is exposed and a space (second space) to which the second opening portion 12b is exposed. The gate valve 100 separates (closes) the flow passage H communicating the first opening portion 12a to the second opening portion 12b, that is, the flow passage H communicating the first space to the second space, and releases this separated state (communicates the first space to the second space).

In the hollow portion 11 of the valve box 10, the rotation shaft 20, the neutral valve 30, two of the movable valve A60 (slide valve plate) and the movable valve B50 (counter plate) which form the movable valve 40, and two of the force-applying unit B80 (holding spring) and the force-applying unit C90 (auxiliary spring) are provided. The force-applying unit A (lifting and lowering mechanism) is provided inside the frame forming the valve box 10.

(Rotation Shaft 20)

The rotation shaft 20 extends in a state of being substantially parallel to the flow passage H, penetrates through the valve box 10, and is rotatably provided. The rotation shaft 20 is rotatable by a drive unit which is not shown in the figure.

A connection member (not shown in the figure) is firmly attached to the rotation shaft 20. The connection member is, for example, a member formed in a substantially flat plate, and is firmly attached to one end of the rotation shaft 20 by a screw.

(Neutral Valve 30)

The neutral valve 30 extends in a direction orthogonal to the axis line of the rotation shaft 20 and is disposed so as to be included in a plane parallel to the direction. The neutral valve 30 is directly fixed to the rotation shaft 20 via a connection member (not shown in the figure) or without a connection member (not shown in the figure).

As shown in FIG. 1, the neutral valve 30 includes: a circular portion 30a that overlaps the movable valve 40; and a rotation portion 30b that rotates the circular portion 30a in accordance with rotation of the rotation shaft 20. The rotation portion 30b is located between the rotation shaft 20 and the circular portion 30a and is formed in an arm shape such that two arms extend in a direction from the rotation shaft 20 to the circular portion 30a. Consequently, the circular portion 30a may be referred to as an arm portion.

The rotation shaft 20 and the neutral valve 30 which are mentioned above rotate with respect to the valve box 10 but is provided so that the positions thereof do not vary in the direction of the flow passage H.

The rotation shaft 20 can be selectively connected to any of the upper side and the lower side in the flow passage direction H with respect to the neutral valve 30. Alternatively, the entire neutral valve body 5, that is, both surfaces of the neutral valve body 5 can be attached to the rotation shaft 20.

In the embodiment, the case will be described where operation of opening and closing the gate valve is carried out in accordance with the placement of the gate valve in which the neutral valve body 5 moves so that the movable valve 40 blocks the first opening portion 12a when the gate valve is closed.

(Movable Valve 40, Movable Valve B50 (Movable Valve Plate: Counter Plate), and Movable Valve A60 (Movable Valve Frame: Slide Valve Plate))

The movable valve 40 is formed in a substantially disk shape and includes: the movable valve B50 that is formed in a substantially concentric form with respect to the circular portion 30a; and the movable valve A60 that is disposed so as to surround the circumference of the movable valve B50 and is formed in a substantially circular ring shape. The movable valve A60 is slidably connected to the neutral valve 30 in the direction of the flow passage H. Moreover, the movable valve B50 is slidably fitted into the movable valve A60.

The movable valve B50 and the movable valve A60 can move and slide by the force-applying unit B80 (holding spring) in the direction (reciprocal direction) represented by reference numerals B1 and B2 (FIG. 2). Here, the direction represented by reference numerals B1 and B2 is a direction perpendicular to the surfaces of the movable valve B50 and the movable valve A60, and is the direction of the flow passage H parallel to the axial direction of the rotation shaft 20.

Additionally, an inner-crank portion 50c is formed on the entire region near the outer-periphery of the movable valve B50. In addition, an outer-crank portion 60c is formed on the entire region near the inner-periphery of the movable valve A60.

In the embodiment, the outer-crank portion 60c has a sliding surface 60b parallel to the direction of the flow passage H. The inner-crank portion 50c has a sliding surface 50b parallel to the direction of the flow passage H. The outer-crank portion 60c and the inner-crank portion 50c are fitted to each other so that the sliding surfaces 50b and 60b are slidable to each other. In order to achieve this sliding, a third seal portion 52 (slide sealing packing) formed of an O-ring or the like is disposed between the outer-crank portion 60c and the inner-crank portion 50c.

The first seal portion 61 (valve plate sealing packing) that is formed in a circular ring shape so as to correspond to the shape of the first opening portion 12a and is formed of, for example, an O-ring or the like is provided on the surface of the movable valve A60 which is opposed to (in contact with) the inner surface of the valve box 10.

In the case where the movable valve 40 covers the first opening portion 12a when the gate valve is closed, the first seal portion 61 is in contact with the valve box inner surface 10A of the valve box 10 which forms the circumferential edge of the first opening portion 12a, and is pressed by the movable valve A60 and the valve box inner surface 10A of the valve box 10. Because of this, the first space is reliably isolated from the second space (separated state is ensured).

A second seal portion 51 (counter cushion) that is formed in a circular ring shape so as to correspond to the shape of the second opening portion 12b and is formed of, for example, O-ring or the like is provided on the surface of the movable valve B50 which is opposed to (in contact with) the valve box inner surface 10A of the valve box 10.

(Force-Applying Unit B80 (Holding Spring))

The force-applying unit B80 (holding spring) is located between the movable valve A and the movable valve B and is locally disposed on the region on which the movable valve A60 overlaps the movable valve B50. That is, the force-applying unit B80 is built in the movable valve 40 (between movable valve A60 and the movable valve B50). The points at which the force-applying units B80 are provided are preferably three points or more and are separated from each other. As alignment in which the force-applying units B80 are separated from each other, it is not limited to alignment having even intervals, and a configuration may be adopted in which a plurality of force-applying units B80 are disposed at uneven intervals. FIG. 1 shows a configuration example in which three force-applying units B80 are disposed at the same angular positions (120 degrees) as each other as seen from the center O of the valve body.

The force-applying unit B80 is configured to guide (limit) movement of the movable valve B by a long axis portion of a bolt-shaped guide pin 81 fixed to the movable valve A60 (movable valve frame: slide valve plate). A holding spring forming the force-applying unit B80 is made of an elastic member (for example, spring, rubber, or the like).

The force-applying unit B80 (holding spring) drives the movable valve A60 and the movable valve B50 so that the thicknesses thereof in the flow passage direction H are adjustable. Accordingly, the movable valve B50 works cooperatively with movement of the movable valve A60 in a direction (direction represented by reference numeral B1 or direction represented by reference numeral B2). At this time, since the movable valve B50 drives so that the thickness thereof in the flow passage direction H is adjustable, when the gate valve is closed described above, the impact generated at the time when the first seal portion 61 of the movable valve A60 comes into contact with the valve box inner surface 10A of the valve box 10 is released.

Also, when the gate valve is opened or back pressure occurs, the impact generated at the time when the second seal portion 51 of the movable valve B50 comes into contact with a valve box inner surface 10B of the valve box 10 is released. When the impact is received, a sealed space is formed by the movable valve B50, the valve box inner surface 10B, and the second seal portion 51. In order to remove gas that applies a pressure to this sealed space, a ventilator hole 53 is provided at the movable valve B50.

(Guide Pin 81)

The guide pin 81 is securely fixed to the movable valve A60, provided upright in the flow passage direction H, and formed in a rod shape having a uniform diameter. The guide pin 81 penetrates through the inside of the force-applying unit B80 and is fitted into a hole portion 50h formed at the movable valve B50.

The guide pin 81 limits the positions of the movable valve B50 and the movable valve A60 and reliably guides them so that the direction (axis represented by reference letter Q) in which the movable valve B50 and the movable valve A60 slide to each other does not displace from the direction represented by reference numerals B1 and B2 and so that the movable valve B50 and the movable valve A60 carry out parallel movement without change in the postures thereof even when the movable valve B50 and the movable valve A60 slide to each other.

(Force-Applying Unit C90 (Auxiliary Spring))

The force-applying unit C90 (auxiliary spring) is provided between the neutral valve 30 and the movable valve A60, connects the movable valve A60 to the neutral valve 30 so that a position thereof with respect to the neutral valve in the flow passage direction is changeable in the flow passage direction H of the valve box 10, and applies a force to the movable valve A to be directed to a center position in the flow passage direction. Accordingly, in the embodiment of the present disclosure, in the case where the gate valve turns from the valve closed state (FIG. 7) to the valve opened state (FIG. 2), the force-applying unit C90 works. That is, the force-applying unit C90 has a configuration to prompt mechanical separation operation of separating the movable valve A60 from the inner surface of the valve box 10 in the valve closed state (FIG. 7).

The force-applying unit C90 includes the circular portion 30a located at the outer-periphery position of the neutral valve 30, is located at the outer-periphery position of the movable valve A60, and is provided at a portion (position regulation portion 65) that overlaps the circular portion 30a.

As seen from the center O of the valve body, the force-applying units C90 are disposed at the same angular positions as those of the force-applying units B80. FIG. 1 shows a configuration example in which three force-applying units C90 are disposed.

Similar to the force-applying unit B80, the force-applying unit C90 is an elastic member (for example, spring, rubber, plate spring, or the like).

Particularly, in the case where a plate spring (FIGS. 6 and 11) is used as the force-applying unit C90, since it is possible to provide a function β of maintaining a position of the movable valve A60 in radial direction with respect to the neutral valve 30 (arm) in addition to a function α of drawing the movable valve A60 into the neutral valve 30 (arm) and holding the movable valve (function of prompting mechanical separation operation from the valve closed state (FIG. 7)), it is more preferable.

FIG. 6 is a schematic cross-sectional view showing the force-applying unit C90 in the case where the gate valve is in the valve opened state (FIG. 2). FIG. 11 is a schematic cross-sectional view showing the force-applying unit C90 in the case where the gate valve is in the valve closed state (FIG. 7).

As shown in FIG. 6 or 11, the portions close to both end portions of the plate spring (force-applying unit C90) hold ring-shaped members 92a and 93a by fixation pins 92 and 93 and are locked along the circumferential direction of the circular portion 30a of the neutral valve 30. Furthermore, the portion close to the center portion of the plate spring is locked to the position regulation portion 65 of the movable valve A60 by a pressure applying pin 91.

The plate spring in the case where the gate valve is in the valve opened state (FIG. 2) has curve portions 90A, and therefore is in a state where the distance thereof in height direction is contracted, that is, in a state where a separation distance of the movable valve A60 with respect to the neutral valve 30 (arm) is narrow (FIG. 6).

In contrast, the plate spring in the case where the gate valve is in the valve closed state (FIG. 7) releases the curve portions 90A shown in FIG. 6, and therefore is in a state where the distance thereof in height direction is expanded, that is, in a state where separation distance of the movable valve A60 with respect to the neutral valve 30 (arm) widens (FIG. 11).

As described above, as a result of adopting the plate spring having an extremely simple structure as the force-applying unit C90, the force-applying unit C90 of the gate valve according to one or more embodiments of the present disclosure can stably obtain the aforementioned two functions (function α and function β).

(Force-Applying Unit A70 (Lifting and Lowering Mechanism))

The force-applying unit A70 (lifting and lowering mechanism) is built in the valve box and forms a body different from the valve body including two of the movable valve A and the movable valve B and two of the force-applying unit B and the force-applying unit C.

By the hydraulic pressure acted due to supply of oil (working fluid, pressurized incompressible fluid) from the hydraulic driver 700 to the hydraulic pressure drive unit (fixed portion) 71, the force-applying unit A70 causes the front-end portion of the movable portion 72 to extend toward the movable valve A60. According to this operation, the force-applying unit A70 applies a force to the movable valve A60 to be directed to the first opening portion 12a in the flow passage direction H. Due to the extension operation of the movable portion 72, the force-applying unit A70 has a function of causing the first seal portion 61 to be in close contact with the valve box inner surface 10A located at the periphery of the first opening portion 12a.

The extension operation of the movable portion 72 can be carried out in all the force-applying units A70 built in the valve box 10 at the substantially same time. Note that, the force-applying unit A70 does not have a function of causing the first seal portion 61 to be separated from the valve box inner surface 10A located at the periphery of the first opening portion 12a but has a function such that the force-applying unit returns to the position (position in the fixed portion 71 which will be described later) from which it (movable portion 72 which will be described later) initially moves. Therefore, the force-applying unit A70 is a lifting and lowering mechanism capable of extending and contracting in a direction from the force-applying unit A70 toward the movable valve A60.

In the valve box 10, each of the force-applying units A70 having the above-described configuration is disposed at the position at which the force-applying unit acts with respect to the movable valve A60 and is provided along the movable valve A60.

In the configuration example shown in FIG. 1, the points at which the force-applying units A70 are provided are preferably three points or more and are separated from each other.

As alignment in which the force-applying units A70 are separated from each other, it is not limited to alignment having even intervals, and a configuration may be adopted in which a plurality of force-applying units A70 are disposed at uneven intervals. FIGS. 1, 23, and 24 each shows a configuration example in which four force-applying units A70 are disposed at the same angular positions (90 degrees) as each other as seen from the center O of the valve body.

The force-applying units A70 in the configuration example shown in FIG. 1 are configured so that the angular positions of the force-applying units A70 do not overlap the angular positions at which the force-applying unit B80 and the force-applying unit C which are described above.

The force-applying unit A70 according to the embodiment is configured to include: the hydraulic pressure drive unit (fixed portion) 71 that is provided inside the valve box 10; the movable portion 72 that is extendable in a direction from the hydraulic pressure drive unit (fixed portion) 71 toward the movable valve A60.

The hydraulic pressure drive unit (fixed portion) 71 is connected to the hydraulic driver 700 and is configured to be able to extend and contract the movable portion 72 by a hydraulic pressure supplied from the hydraulic driver 700 in the aforementioned direction.

As shown in FIG. 23, the hydraulic driver 700 includes: a hydraulic pressure generator 701 that generates a hydraulic pressure and supplies the hydraulic pressure to the hydraulic pressure drive unit (fixed portion) 71; a hydraulic pipe 702 that connects the hydraulic pressure generator 701 and the hydraulic pressure drive unit (fixed portion) 71; a solenoid valve 703 that is provided at the hydraulic pipe 702 and can operate to stop supply of the hydraulic pressure when opening operation of the movable valve A60 is completed; a changeover valve 704 that is provided at the hydraulic pipe 702, detects that rotation of the rotation shaft 20 is located at the closing position, and can switch the supply of the hydraulic pressure; a drive unit 705 such as a motor that drives the hydraulic pressure generator 701; a controller (control unit) 706 that controls the drive unit 705; and a power supply 707 that supplies electric power for driving the drive unit 705.

Moreover, as shown in FIGS. 26 to 28, the hydraulic pressure generator 701 is configured to be able to carry out normally-closing.

In the force-applying unit A70, a multiple-stage seal structure is provided which prevents oil serving as working fluid from leaking to the vacuum side in which the movable valve A60 is disposed, when a hydraulic pressure is generated.

When the hydraulic pressure generator 701 carries out operation of causing the movable portion 72 to extend and contract, the hydraulic pressure generator supplies a hydraulic pressure that is a positive pressure or a negative pressure to the hydraulic pressure drive unit (fixed portion) 71, and can stop the supply of the hydraulic pressure to the hydraulic pressure drive unit 71 when the operation is completed. In addition, the hydraulic pressure generator 701 can adequately control a contact state of the movable portion 72 with respect to the movable valve A60.

FIGS. 26 to 28 are cross-sectional views showing the hydraulic pressure generator 701 of the hydraulic driver 700. FIG. 26 shows a valve closing state of the hydraulic pressure generator 701 of the hydraulic driver 700. FIG. 27 shows a closing-opening state of the hydraulic pressure generator 701 of the hydraulic driver 700. FIG. 28 shows an over-pressure state of the hydraulic pressure generator 701 of the hydraulic driver 700.

As shown in FIG. 26, the hydraulic pressure generator 701 includes: a hydraulic cylinder 710 that pressurizes pressure oil serving as incompressible fluid and supplies the oil to the hydraulic pressure drive unit (fixed portion) 71; a force-applying member 720 that applies a force to the hydraulic cylinder 710; a cylinder drive unit 730 that acts against the force-applying member 720 and can drive the hydraulic cylinder 710; and a casing 750 that accommodates these members therein.

The hydraulic cylinder 710 includes: a bottomed cylinder body 711; and a piston 712 that is movable relative to the cylinder body 711 in an axis direction thereinside.

The piston 712 has a hydraulic flow passage 713 that penetrates through the inside thereof in the axis line of the piston 712, and the hydraulic flow passage 713 is connected to the hydraulic pipe 702. The hydraulic flow passage 713 allows the pressure oil serving as incompressible fluid (driving fluid) to flow into or flow out from the hydraulic pipe 702.

The hydraulic flow passage 713 of the piston 712 connected to the hydraulic pipe 702 penetrates through the casing 750. The end 712a of the piston 712 is sealed by an O-ring and a seal member and is attached to and fixed to the casing 750.

The end 712b opposite to the end 712a of the piston 712 is located inside the cylinder body 711. The piston 712 is coaxially located on the cylinder body 711.

The end 711a (first end) of the cylinder body 711 is opened. The end 712b of the piston 712 is inserted into the inside of the cylinder body 711 through the end 711a of the cylinder body 711.

The cylinder body 711 is movable relative to the piston 712 in the axis direction. The cylinder body 711 is movable relative to the casing 750 in the axis direction.

The end 711b (second end) of the cylinder body 711 blocks the internal space of the cylinder body 711. A hydraulic space 714 is formed by the bottom face of the cylinder body 711 (the face opposite to the end 711b) and the end face of the end 712b of the piston 712. The hydraulic space 714 is filled with the pressure oil serving as incompressible fluid (driving fluid).

The volume of the hydraulic space 714 increases or decreases in the case where the cylinder body 711 moves relative to the piston 712 in the axis direction. In accordance with the increase and decrease in the volume of the hydraulic space 714, the pressure oil filling the hydraulic space 714 flows into or flows out from the hydraulic pipe 702 through the hydraulic flow passage 713.

A flange portion 711c is provided at the outer circumferential position on the end 711a of the cylinder body 711. The flange portion 711c is circumferentially provided on the end 711a so as to protrude toward the outer side of the cylinder body 711 in the radial direction.

An end 721b of an inner spring 721 and an end 722b of an outer spring 722 which serve as the force-applying member 720 are in contact with the surface facing the end 711b of the cylinder body 711 inside the casing 750.

A peripheral groove 711d is located adjacent to the outer peripheral face of the cylinder body 711 and is circumferentially provided on the surface opposite to the end 711a of the flange portion 711c. The end 721a of the inner spring 721 serving as the force-applying member 720 is in contact with the peripheral groove 711d. The end 722a of the outer spring 722 is in contact with the outer circumferential position of the peripheral groove 711d of the flange portion 711c.

The force-applying member 720 includes the inner spring 721 and the outer spring 722. The inner spring 721 and the outer spring 722 are each a coil spring. The inner spring 721 and the outer spring 722 are coaxially arranged with respect to the cylinder body 711 and the piston 712. The inner spring 721 has an internal diameter slightly larger than the diameter of the outer peripheral face of the cylinder body 711. The outer spring 722 has an internal diameter slightly larger than the outer diameter of the inner spring 721. The outer spring 722 has a wire diameter larger than that of the inner spring 721. A force applied by the outer spring 722 is greater than that of the inner spring 721.

The force applied by inner spring 721 and the outer spring 722 in the extension and contraction direction can be transmitted to the cylinder body 711. Both the inner spring 721 and the outer spring 722 apply a force to and press the flange portion 711c of the cylinder body 711 against the end 712a of the piston 712.

The end 721b of the inner spring 721 and the end 722b of the outer spring 722 are in contact with the casing 750. Consequently, the force-applying member 720 applies a force to the cylinder body 711 to be directed to the casing 750.

Note that, as long as the force-applying member 720 can apply a force to the cylinder body 711, the configuration thereof is not limited to this.

A bush 711e and Y-shaped packing 711f and 711g are provided on the inner peripheral face of the cylinder body 711 and at the position close to the end 711a. The inner peripheral face of the cylinder body 711 and the outer peripheral face of the piston 712 are slidably and tightly sealed.

The end 731a of the drive shaft 731 of the cylinder drive unit 730 is coaxially connected to the outside position of the end 711b of the cylinder body 711.

The cylinder drive unit 730 includes: the drive shaft 731 that moves the cylinder body 711 relative to the piston 712 in the axis direction; and a drive transmission that drives the drive shaft 731 by the drive unit 705 such as a motor.

Inside the casing 750, the drive shaft 731 is disposed coaxially with respect to the cylinder body 711 and the piston 712. The drive shaft 731 is movable in the axial direction. The drive shaft 731 is movable relative to the piston 712 and the casing 750 in the axis direction.

A ball screw 731c is formed on the outer peripheral face of the drive shaft 731 at the position close to the end 731a.

The length of the ball screw 731c in the axial direction of the drive shaft 731 is set so that a state can be maintained where an inner screw surface 732c which will be described later is screwed to the entire region of the ball screw 731c (the peripheral region, screw formation surface) when the cylinder body 711 moves in the axial direction.

A screw drive gear 732 is coaxially disposed on the outer side of the drive shaft 731 in the radial direction thereof and on the outer circumferential position of the ball screw 731c. The drive shaft 731 is supported by the screw drive gear 732 with respect to the casing 750.

At the end 731b opposite to the end 731a of the drive shaft 731, a rotation stopper 731h which will be described later is provided so as to protrude in the radial direction thereof. The rotation stopper 731h is located inside a slide groove 757 provided in the casing 750 and limits the direction of movement of the drive shaft 731 so that the drive shaft 731 does not rotate but is movable in the axial direction.

The screw drive gear 732 is formed in a tubular shape. The screw drive gear 732 is supported so as to be rotatable with respect to the casing 750.

Ball bearings 732f and 732g are provided on the periphery of the screw drive gear 732. The ball bearings 732f and 732g support the screw drive gear 732 and can coaxially rotate the drive shaft 731 relative to the casing 750.

Note that, the screw drive gear 732 does not move relative to the casing 750 in the axial direction.

The inner screw surface 732c is formed on the inner-periphery of the screw drive gear 732. The inner screw surface 732c is screwed together with the ball screw 731c of the drive shaft 731.

In the case where the screw drive gear 732 rotates, the ball screw 731c that is screwed together with the inner screw surface 732c, a torque is applied to the drive shaft 731. The rotation of the drive shaft 731 is limited by the rotation stopper 731h and the slide groove 757. Accordingly, the drive shaft 731 moves in the direction limited by the slide groove 757, that is, in the axial direction of the drive shaft 731.

An outer gear 732d is formed on the periphery of the screw drive gear 732. The outer gear 732d is formed at the position sandwiched between the ball bearings 732f and the ball bearings 732g in the axial direction of the screw drive gear 732. The outer gear 732*d* is located at the outmost side in the radial direction of the screw drive gear 732.

Note that, the inner screw drive gear 732*a* formed on the inner screw surface 732*c* and the outer screw drive gear 732*b* formed on the outer gear 732*d* can be integrally connected in the screw drive gear 732.

The outer gear 732*d* is engaged with a drive gear 733*d*. The drive gear 733*d* has a rotation axis line parallel to the axis line of the drive shaft 731. The drive gear 733*d* is rotatably supported by a rotation shaft 734 parallel to the axis line of the drive shaft 731. The rotation shaft 734 is supported by the casing 750 at the position separated from the outside of the drive shaft 731 in the radial direction thereof.

The drive gear 733*d* is formed integrally with a drive gear 733*e* located on the same axis line as that of the drive gear 733*d*. The drive gear 733*e* has a diameter larger than that of the drive gear 733*d*. The drive gear 733*e* rotates integrally with the drive gear 733*d*.

The drive gear 733*e* is engaged with a drive gear 735. The drive gear 735 has a rotation axis line parallel to the axis line of the drive shaft 731. The drive gear 735 is rotatably supported by a rotation shaft 736 parallel to the axis line of the drive shaft 731. The rotation shaft 736 is supported by the casing 750 at the outside position in the radial direction of the drive shaft 731 and at the position further separated from the rotation shaft 734.

The drive gear 735 is engaged with a drive gear 737. The drive gear 737 has a rotation axis line parallel to the axis line of the drive shaft 731. The drive gear 737 is fixed to a rotating drive shaft 705*a* of the drive unit 705 such as a motor which is parallel to the axis line of the drive shaft 731. The rotating drive shaft 705*a* is disposed at the outside position in the radial direction of the drive shaft 731 and at the position further separated from the rotation shaft 736. The rotating drive shaft 705*a* is rotatably attached to the casing 750 in a state of penetrating therethrough.

The screw drive gear 732, the ball bearings 732*f* and 732*g*, the inner screw surface 732*c*, the outer gear 732*d*, the drive gear 733*d*, the drive gear 733*e*, the rotation shaft 734, the drive gear 735, the rotation shaft 736, and the drive gear 737 constitute a drive transmission.

The casing 750 includes a tubular-shaped casing tube 751, a casing lid 752 that blocks one end of the casing tube 751, a rear casing 753 that blocks the other end of the casing tube 751, a ring 754 provided between the casing lid 752 and the rear casing 753 in the inside (storage space 755) of the casing tube 751, and a lid 758 that blocks the other end of the rear casing 753.

The casing tube 751 has an internal shape extending coaxially with respect to the cylinder body 711, the piston 712, and the drive shaft 731. The inside of the casing tube 751 forms the storage space 755.

The storage space 755 accommodates the cylinder body 711, the piston 712, the inner spring 721 and the outer spring 722 which serve as the force-applying member 720, and the end 731*a* of the drive shaft 731 thereinside.

The storage space 755 has two openings. The piston 712 is located at one of the two openings, and this opening is blocked by the casing lid 752.

The piston 712 is connected to and fixed to the casing lid 752. The end 712*a* of the piston 712 penetrates through the casing lid 752.

The drive shaft 731 is located at the other of the two openings of the storage space 755, and this opening is blocked by the rear casing 753. The drive shaft 731 penetrates through the rear casing 753.

The ring 754 is provided at the position close to the rear casing 753 in the storage space 755.

The ring 754 is coaxially arranged with respect to the drive shaft 731 and is arranged around the drive shaft 731. The inner-periphery of the ring 754 is separated from the outer-periphery of the drive shaft 731.

The ring 754 has an internal diameter equal to that of the inner-periphery of the flange portion 711*c*, that is, the diameter of the outer peripheral face of the cylinder body 711. Furthermore, the ring 754 has an outer diameter equal to that of the outer diameter of the flange portion 711*c*.

The end 721*b* of the inner spring 721 and the end 722*b* of the outer spring 722 which serve as the force-applying member 720 are in contact with the surface facing the casing lid 752 of the ring 754.

A peripheral groove 754*d* is circumferentially provided on the surface facing the casing lid 752 of the ring 754 so as to correspond to the peripheral groove 711*d*. The end 721*b* of the inner spring 721 serving as the force-applying member 720 is in contact with the peripheral groove 754*d*. The end 722*b* of the outer spring 722 is in contact with the surface that is located at the periphery of the peripheral groove 754*d* and faces the casing lid 752 of the ring 754.

Driving system support portions 751*k* and 753*k* that extend toward the outside of the storage space 755 in the radial-outer direction of the drive shaft 731 are provided at the casing tube 751 and the rear casing 753. The driving system support portions 751*k* and 753*k* are formed in a flange shape that forms part of the casing tube 751 and the rear casing 753 in the circumferential direction.

The driving system support portion 751*k* and the driving system support portion 753*k* are in contact with each other. The screw drive gear 732, the ball bearings 732*f* and 732*g*, the inner screw surface 732*c*, the outer gear 732*d*, the drive gear 733*d*, the drive gear 733*e*, the rotation shaft 734, the drive gear 735, the rotation shaft 736, and the drive gear 737 are sandwiched between the driving system support portion 751*k* and the driving system support portion 753*k*.

Recessed and projected portions corresponding to the screw drive gear 732, the ball bearings 732*f* and 732*g*, the inner screw surface 732*c*, the outer gear 732*d*, the drive gear 733*d*, the drive gear 733*e*, the rotation shaft 734, the drive gear 735, the rotation shaft 736, and the drive gear 737 are formed on the surfaces on which the driving system support portion 751*k* and the driving system support portion 753*k* face each other. The recessed and projected portions support these members.

Moreover, the rotating drive shaft 705*a* penetrates through the driving system support portion 751*k*. The drive unit 705 such as a motor is attached to the driving system support portion 751*k*.

The ball bearing 732*f* is provided between the casing tube 751 and the outer screw drive gear 732*b* (screw drive gear 732). The ball bearing 732*f* rotatably supports the screw drive gear 732 relative to the casing tube 751.

The ball bearing 732*g* is provided between the rear casing 753 and the outer screw drive gear 732*b* (the screw drive gear 732). The ball bearing 732*g* rotatably supports the screw drive gear 732 relative to the rear casing 753.

A rear space 756 serving as a back clearance of the end 731*b* of the drive shaft 731 when the drive shaft 731 moves in the axial direction is formed in the rear casing 753.

The screw drive gear 732 is disposed at the position of the boundary between the rear space 756 and the storage space 755. Particularly, the drive shaft 731 is disposed at the position of the boundary between the rear space 756 and the storage space 755 so as to be movable in the axial direction.

The slide groove 757 is formed in the rear space 756 so as to increase the diameter thereof. The slide groove 757 is located outside in the radial direction of the drive shaft 731. As the rotation stopper 731*h* slides on the inside of the slide groove 757, the rotation of the drive shaft 731 is limited and the drive shaft 731 can be moved in the axial direction.

The end of the rear space 756 is blocked by the lid 758.

A limiter switch 760 with which the end 731*b* of the drive shaft 731 can be in contact is provided at the position close to the lid 758 in the rear space 756. The limiter switch 760 is connected to the controller 706.

In the case where the drive shaft 731 moves in a direction from the storage space 755 to the rear space 756, the limiter switch 760 detects that the end 731*b* of the drive shaft 731 comes into contact with the limiter switch 760. At this time, the limiter switch 760 outputs to the controller 706 that the end 731*b* of the drive shaft 731 reaches at a predetermined position. The controller 706 that received the signal outputs a signal of stopping driving of the drive unit 705 such as a motor. Consequently, the driving of the drive unit 705 such as a motor is stopped. Accordingly, the movement position of the drive shaft 731 is limited depending on the position at which the limiter switch 760 is provided.

The hydraulic pressure generator 701 can drive the drive unit 705 such as a motor in accordance with the output signal of the controller 706.

When the controller 706 outputs a drive signal, the drive unit 705 such as a motor is driven, the rotating drive shaft 705*a* rotates. Due to the rotation of the rotating drive shaft 705*a*, the drive gear 737 attached to the rotating drive shaft 705*a* rotates. The rotation of the drive gear 737 is transmitted to the drive gear 735 engaged with the drive gear 737. The rotation of the drive gear 735 is transmitted to the drive gear 733*e* engaged with the drive gear 735. The rotation of the drive gear 733*e* is transmitted to the drive gear 733*d* that is formed integrally with the drive gear 733*e*. The rotation of the drive gear 733*d* is transmitted to the outer gear 732*d* engaged with the drive gear 733*d* and the screw drive gear 732 thereby rotates. The rotation of the outer gear 732*d* is transmitted to the inner screw surface 732*c* of the screw drive gear 732 that is formed integrally with the outer gear 732*d*.

The rotation of the inner screw surface 732*c* of the screw drive gear 732 is transmitted to the ball screw 731*c* of the drive shaft 731 engaged with the screw drive gear 732 and the drive shaft 731 thereby rotates. The screw drive gear 732 is supported by the ball bearings 732*f* and 732*g*. Therefore, even where the screw drive gear 732 rotates, the screw drive gear 732 does not move in the axial direction. The drive shaft 731 is supported by the inner screw surface 732*c*, the rotation stopper 731*h* is located inside the slide groove 757, and the direction of movement of the drive shaft 731 is limited. Because of this, in the case where the screw drive gear 732 rotates, the drive shaft 731 moves in the axial direction.

As stated above, the rotation drive force of the drive unit 705 such as a motor is transmitted to the drive shaft 731 by the drive transmission, and the drive shaft 731 thereby moves in the axial direction.

When the drive shaft 731 moves in the axial direction, the cylinder body 711 integrally connected to the drive shaft 731 similarly moves in the axial direction. At this time, the piston 712 is fixed to the casing lid 752 and thereby does not move. Accordingly, the cylinder body 711 moves relative to the piston 712 in the axis direction.

Here, as the cylinder body 711 moves relative to the piston 712, the volume of the hydraulic space 714 inside the cylinder body 711 is changed. The pressure oil filling the hydraulic space 714 serving as incompressible fluid (driving fluid) flows into or flows out from the hydraulic flow passage 713 in accordance with the volume of the hydraulic space 714.

The inner spring 721 and the outer spring 722 which are in contact with the flange portion 711*c* and serve as the force-applying member 720 apply a force to the cylinder body 711.

In the gate valve according to the embodiment, in order to achieve normally closing, a force applied from the force-applying member 720 is generated in the direction in which the inner spring 721 and the outer spring 722 extend. That is, the direction in which the force applied from the force-applying member 720 to the cylinder body 711 is generated coincides with the direction in which the cylinder body 711 separates from the screw drive gear 732. Consequently, the force applied by the force-applying member 720 is imparted to the cylinder body 711 so as to decrease the volume of the hydraulic space 714.

Additionally, the gate valve according to the embodiment can be normally closed, that is, it can be opened when the drive unit 705 such as a motor is driven. Therefore, the moving direction of the drive shaft 731 by the drive of the drive unit 705 such as a motor is opposite to the direction of the force applied by the force-applying member 720. That is, by the drive of the drive unit 705 such as a motor, the drive shaft 731 moves in the direction away from the piston 712. Because of this, by the drive of the drive unit 705 such as a motor, the drive shaft 731 moves so that the volume of the hydraulic space 714 of the cylinder body 711 increases.

In the case where the drive unit 705 such as a motor is not driven in the hydraulic pressure generator 701, as shown in FIG. 26, the volume of the hydraulic space 714 decreases due to the force applied by the force-applying member 720. As a result, the pressure oil serving as incompressible fluid (driving fluid) flows into the hydraulic pipe 702 from the hydraulic space 714 through the hydraulic flow passage 713. In this situation, the hydraulic pressure acts in the force-applying unit A70, and the front-end portion 72*a* of the movable portion 72 thereby extends.

Moreover, in the case where the drive unit 705 such as a motor is driven in the hydraulic pressure generator 701, as shown in FIG. 27, the volume of the hydraulic space 714 increases by the driving power of the drive unit 705 such as a motor. As a result, the pressure oil serving as incompressible fluid (driving fluid) flows into the hydraulic space 714 from the hydraulic pipe 702 through the hydraulic flow passage 713. In this situation, the hydraulic pressure acts in the force-applying unit A70, and the front-end portion 72*a* of the movable portion 72 thereby contracts.

Furthermore, even in cases where the cylinder body 711 overruns toward the casing lid 752 because of some reasons in the hydraulic pressure generator 701, as shown in FIG. 28, the flange portion 711*c* comes into contact with the casing lid 752, and movement of the cylinder body 711 is thereby stopped. Accordingly, reduction in the hydraulic space 714 is limited in a predetermined range. Consequently, the hydraulic pressure generator 701 can cause the pressure oil (driving fluid) to excessively flow to the force-applying unit A70.

With this configuration, the force-applying unit A70 have two functions, that is, a function of causing the front-end portion 72*a* of the movable portion 72 to come into contact with a lower surface 60*sb* of the movable valve A60 and causing the movable valve A60 to move toward the first opening portion 12*a* and a function of causing itself (movable portion 72) to return to the initial motion position (the position in the fixed portion 71), and serves as the lifting and lowering mechanism of the valve body.

FIGS. 2 to 5 shows in a state where the movable valve 40 (movable valve A60 and the movable valve B50) is not in contact with any the valve box inner surfaces 10A and 10B of the valve box 10. This state is referred to as a state where a valve body is FREE. FIG. 6 is an enlarged view showing a relevant part of the force-applying unit C in a state of being FREE (FIG. 2) and is a view showing the force-applying unit C as seen in the paperface depth direction in FIG. 2.

In a state where the valve body is the FREE, due to the function of the aforementioned force-applying unit A70, that is, due to the function of causing the movable valve A60 to move toward the first opening portion 12a, the movable valve A60 moves until being in contact with the valve box inner surface 10A of the valve box 10, the movable valve A60 presses against the valve box inner surface 10A, and therefore the flow passage H is closed (valve closing operation).

FIGS. 7 to 10 shows a state where the flow passage H is closed by the above-mentioned valve closing operation. This state is referred to as a state of positive pressure/non-differential pressure. FIG. 11 is an enlarged view showing a relevant part of the force-applying unit C in a state of positive pressure/non-differential pressure (FIG. 7) and is a view showing the force-applying unit C as seen in the paperface depth direction in FIG. 7.

In a state where the valve body is in the positive pressure/non-differential pressure, due to the function of the aforementioned force-applying unit C90, that is, due to the function of causing the movable valve A60 to be connected to the neutral valve 30 so that the position thereof with respect to the neutral valve in the flow passage direction is changeable and applying a force to the movable valve A to be directed to a center position in the flow passage direction, the movable valve A60 is separated from the inner surface of the valve box 10 and the movable valve A60 is retracted, and the flow passage H is thereby opened (release operation).

As described above, in the gate valve according to the embodiment, since the first seal portion 61 (valve plate sealing packing) formed of O-ring or the like and the third seal portion 52 (slide sealing packing) formed of O-ring or the like are disposed on the substantially same cylindrical surface (for example, they are disposed so as to overlap the line R shown in FIGS. 3 to 5), approximately 100% of a back pressure cancellation rate is obtained.

Furthermore, the force-applying unit A70 of the gate valve according to the embodiment is built in the valve box 10 and forms a body different from the neutral valve body 5 including two of the movable valve A60 and the movable valve B50, two of the force-applying unit B80 and the force-applying unit C90. As a result, in the gate valve 100 according to the embodiment, weight saving of the valve structure by the weight of the force-applying unit A70 is achieved.

Moreover, as compared with the case of using compressible fluid such as compressed air (compressed air) or the like as working fluid, the force-applying unit A70 is configured such that the hydraulic driver 700 causes working fluid to be operated by the hydraulic pressure of incompressible oil, and therefore space-saving is achieved and it is simultaneously possible to carry out reliable valve closing operation. In addition, safety in operation can be improved more than compressed air operation.

Consequently, according to the gate valve of the embodiment, since it is possible to achieve isolation operation with a high degree of reliability and the weight of the valve body is reduced, it is possible to reduce a driving power that is necessary when the valve body moves upward and downward or the valve body moves while revolving, and therefore simplification of the configuration of the valve body and weight saving thereof is achieved.

Figure 20:
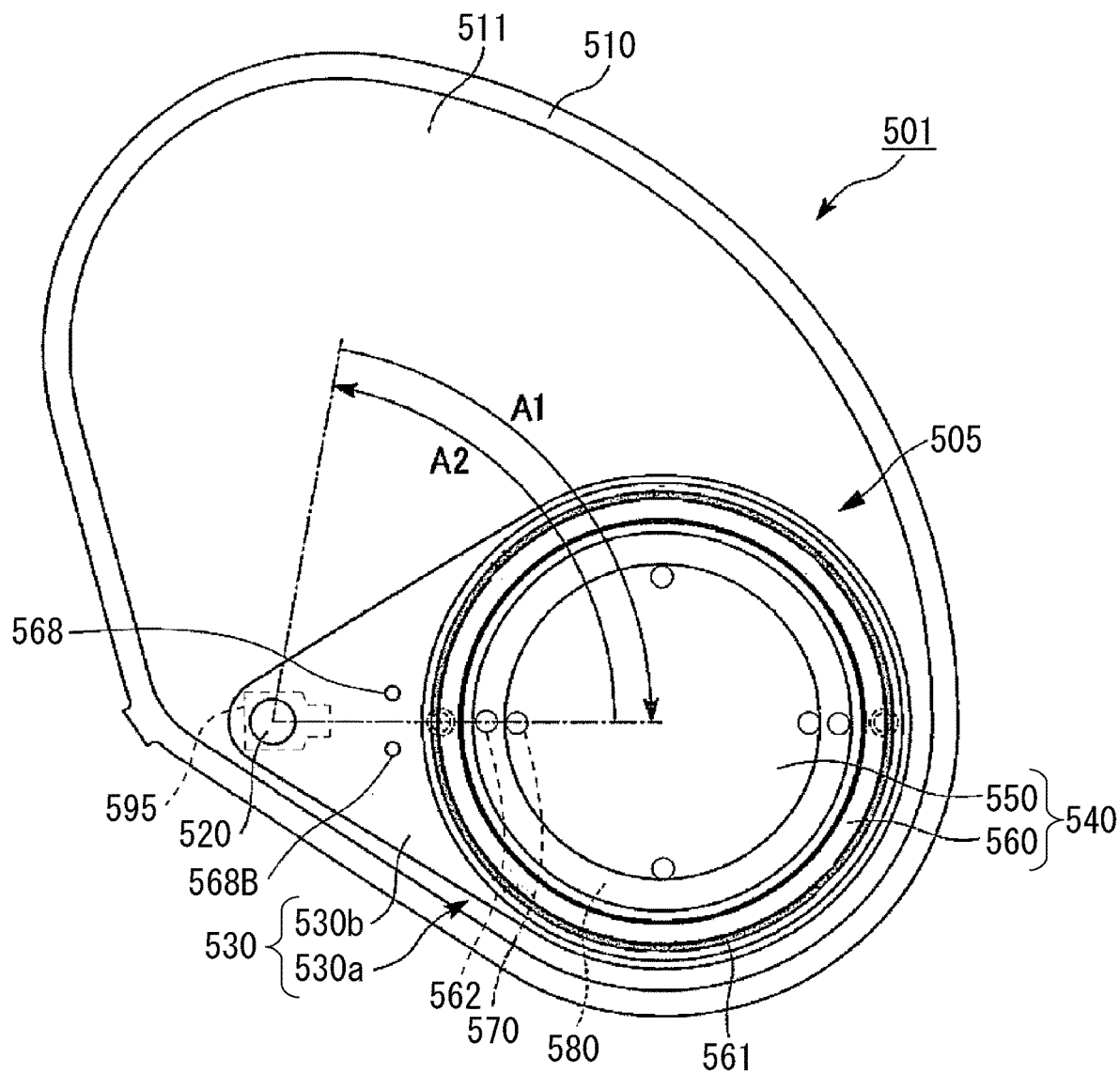
FIG. 20 is a horizontal cross-sectional view showing a configuration of a conventional gate valve.
Figure 21:
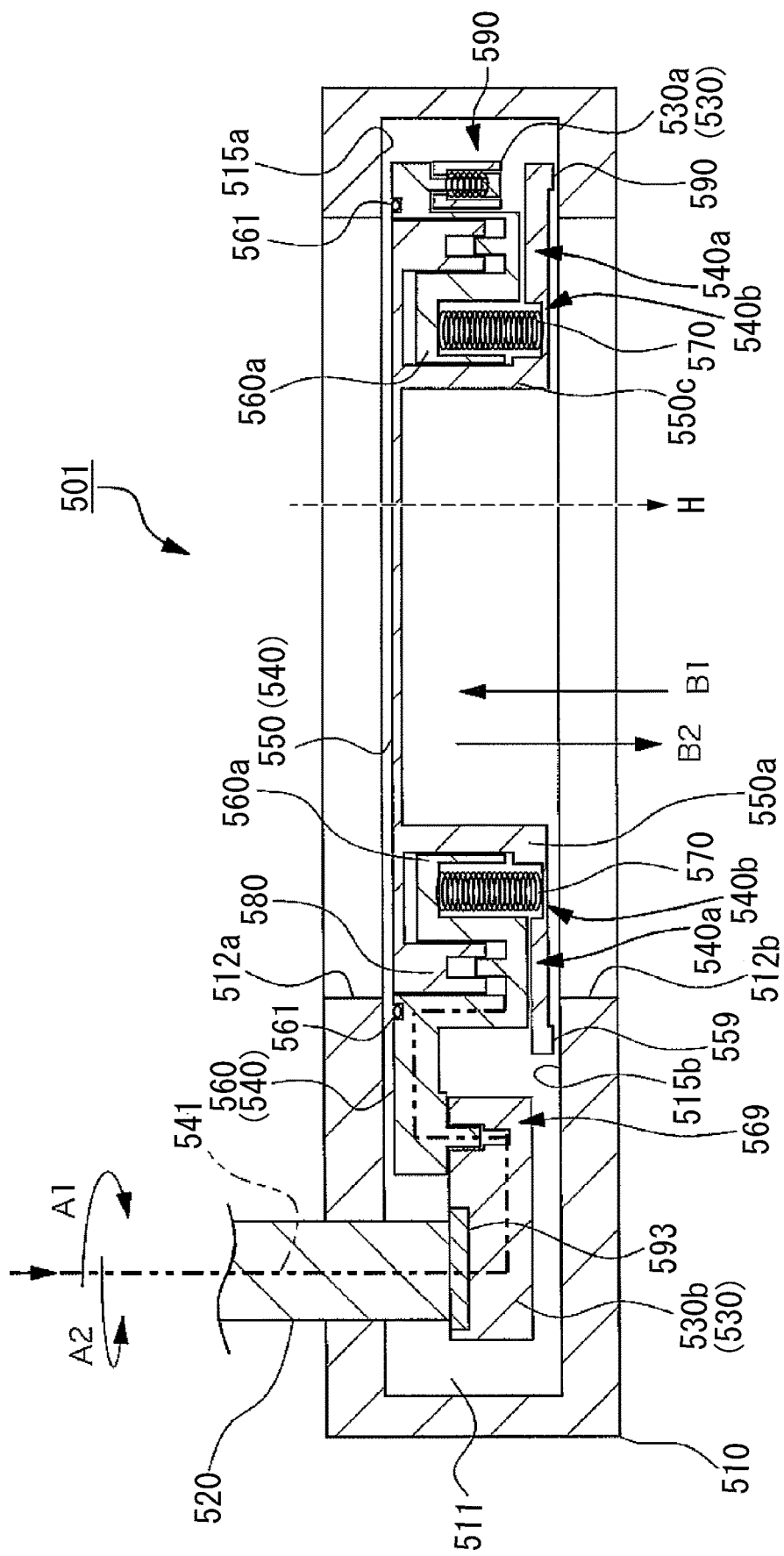
FIG. 21 is a vertical cross-sectional view showing the configuration of the conventional gate valve and is a view showing a case where a valve body is disposed at a position at which a retraction operation can be carried out.
Figure 22:
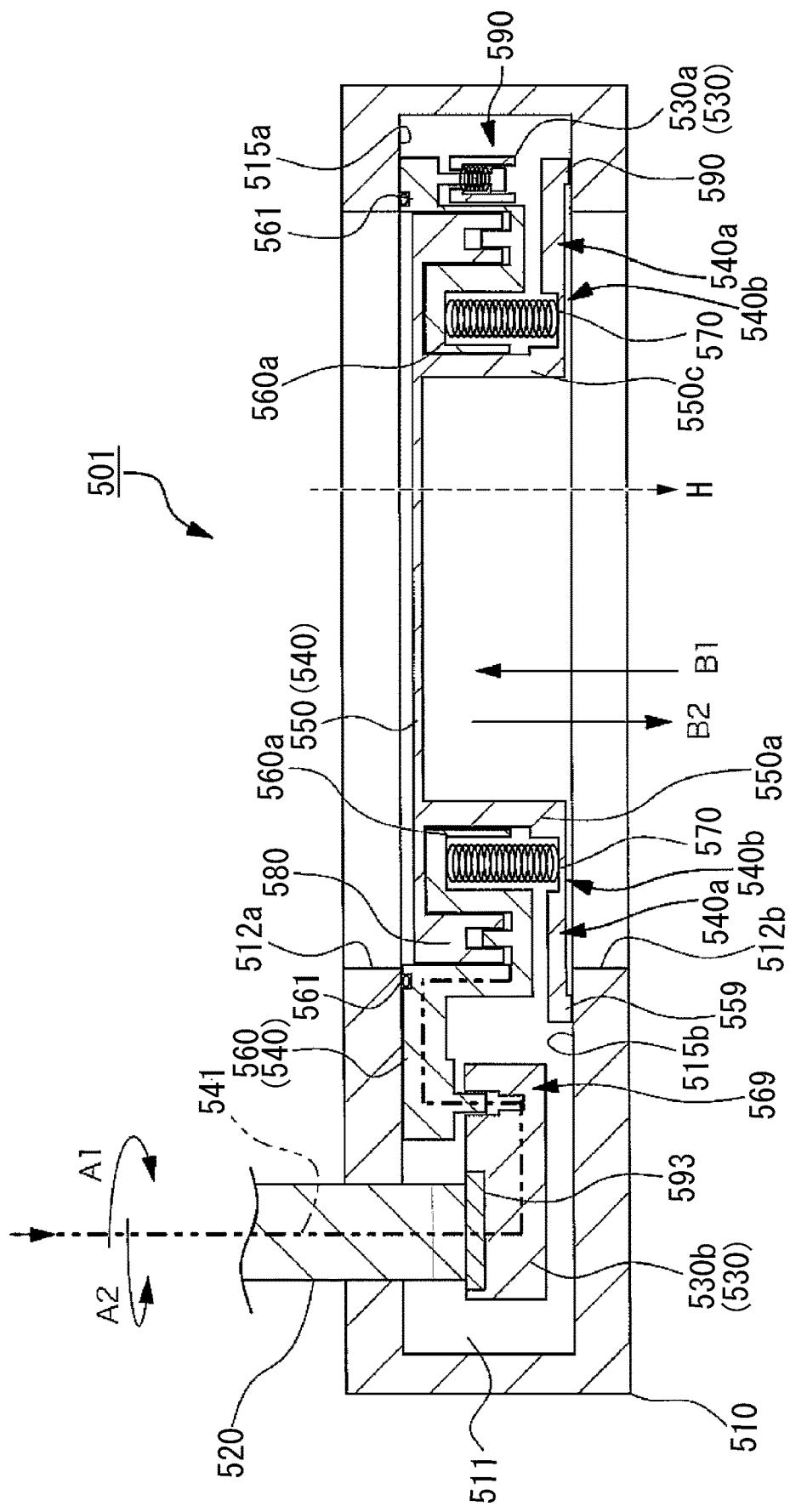
FIG. 22 is a vertical cross-sectional view showing the configuration of the conventional gate valve and is a view showing a case where the valve body is disposed at a valve closing position.

FIGS. 20 to 22 are views showing a conventional gate valve 501, FIG. 20 shows a horizontal cross-sectional view, and FIGS. 21 and 22 are vertical cross-sectional views. FIG. 21 shows a case where a valve body is disposed at a position at which a retraction operation can be carried out, and FIG. 22 shows a case where a valve body is disposed at a valve closing position (Patent Document 4).

As shown in FIGS. 20 to 22, in a conventional gate valve 501, a valve structure thereof includes a ring-shaped air cylinder 580 corresponding to the force-applying unit A70 of the gate valve 100 according to the embodiment, a supply line 541 that introduces compressed air into the air cylinder 580 is also necessary, and the valve structure is extremely complicated. Additionally, in the configuration of a gate valve of a conventional example shown in FIGS. 20 to 22, it is conceivable to carry out closing operation of a valve body having a large surface area. In this case, a required machining accuracy is extremely high in order to satisfy a required high degree of accuracy of operation and a high sealability when the air cylinder 580 is formed in a ring shape. For this reason, there is a concern that manufacture of the foregoing conventional gate valve brings a high cost.

In contrast, since the force-applying unit A70 according to the embodiment of the present disclosure is disposed inside the valve box 10, is not included in a valve structure, and simplification of the valve structure thereof is also achieved. The supply line 541 that is essential for the conventional gate valve 501 is not necessary for the gate valve 100 according to the embodiment. Furthermore, since a plurality of pistons and cylinders which have a common configuration and a cylindrical and column shape can be used as the force-applying unit A70, it is possible to manufacture the gate valve that satisfies a required high degree of accuracy of operation and a high sealability at a low cost.

Accordingly, since the gate valve according to the embodiment of the present disclosure employs the force-applying unit A70 that is disposed inside the valve box and is not included in the valve structure, as a drive unit that causes the rotation shaft 20 to rotate, a member or a device which is driven by power lower than a conventional case can be selected at a low cost, and therefore the present disclosure contributes to achievement of an energy saving gate valve.

Consequently, the present disclosure contributes to provision of the gate valve that can carry out isolation operation with a high degree of reliability, achieves a weight saving of a movable valve, can realize 100% of a back pressure cancellation rate, and has a normally close configuration.

Note that, although FIG. 2 shows the configuration in which the force-applying unit A70 is built in the valve box 10 (10b) at the position close to the second opening portion 12b, the present disclosure is not limited to this configuration. For example, instead of the position close to the second opening portion 12b, the force-applying unit A70 may be provided at the position close to the first opening portion 12a. As long as the force-applying unit A70 acts with respect to the movable valve A60, the position at which the force-applying unit A70 is provided can be freely determined.

In the above-mentioned embodiment, FIG. 2 shows a configuration example of the force-applying unit A70 causes compressive force to act with respect to the movable valve A60, and valve closing operation is carried out by mechanical contact operation; however, the present disclosure is not limited to this configuration.

As the force-applying unit A70 having a function of acting a compressive force, not only hydraulic pressure but also, for example, a compressed air mechanism, an electromagnetic mechanism, or the like as well as the above-described cylinder mechanism may be adopted. Note that, in the case where the gate valve 100 does not have a large surface area, the compressed air mechanism or the like is particularly effective to use as the force-applying unit A70. The reason for this is that, opening and closing operations can be safely carried out without depending on the installation posture of the gate valve 100.

Note that, a configuration example of the force-applying unit A70 having both the function of causing compressive force to act with respect to the movable valve A60 and the function of causing tensile force to act with respect to the movable valve A60 will be described as modified example with reference to FIGS. 17 to 19 which will be described later.

As apparent from FIG. 3 that is a cross-sectional view taken along the line segment A-O shown in FIG. 1, the force-applying unit A70 shown in FIG. 2 is disposed under the movable valve A60 (paperface back side) in FIG. 1. That is, as shown in FIGS. 23 and 24, the embodiment shows a configuration example in which the force-applying units A70 are disposed four points at a 90-degree pitch. Although the configuration example shows the case where the four force-applying units A70 are disposed at even intervals, the present disclosure is not limited to this configuration, it is only necessary that the number of the force-applying units A70 is a plural number of three or more, and the intervals of the force-applying unit A70 may be uneven intervals.

Moreover, although the embodiment discloses a pin-shaped cylinder that serves as a member functioning as the force-applying unit A70 that is locally disposed inside the valve box 10, the present disclosure is not limited to this member. For example, instead of the pin-shaped cylinder, a ring-shaped cylinder may be used as the force-applying unit A70.

(State where Valve Body is Located at Position (FREE) at which Retraction Operation can be Carried Out)

Hereinbelow, a state where a valve body is FREE will be described with reference to FIGS. 1 to 6.

FIG. 1 is a horizontal cross-sectional view showing the configuration of the gate valve according to the embodiment of the present disclosure, and FIG. 2 is a vertical cross-sectional view. FIG. 3 is an enlarged view showing a relevant part taken along the line segment A-O shown in FIG. 1, FIG. 4 is an enlarged view showing a relevant part taken along the line segment B-O shown in FIG. 1, and FIG. 5 is an enlarged view showing a relevant part taken along the line segment C-O shown in FIG. 1. Additionally, FIG. 6 is an enlarged view showing a relevant part of a force-applying unit C shown in FIG. 2.

A state where the neutral valve body 5 is FREE means a state where the neutral valve body 5 is not in contact with the inner surface of the valve box 10 (the inner surface of the valve box 10 located around the first opening portion 12a, the inner surface of the valve box 10 located around the second opening portion 12b).

The force-applying unit A70 (lifting and lowering mechanism) is configured to include: the fixed portion 71 disposed inside the valve box 10; and the movable portion 72 capable of extending and contracting in a direction from the fixed portion 71 toward the movable valve A60 by the hydraulic pressure, and is in a state of being disposed inside the valve box 10 together with the fixed portion 71 and the movable portion 72. That is, the force-applying unit A70 (lifting and lowering mechanism) forming a body different from the neutral valve body 5 is in a state of not being in contact with the neutral valve body 5.

In other words, the force-applying unit A70 (lifting and lowering mechanism) is built in the valve box 10 and forms a body different from the neutral valve body 5 including two of the movable valve A60 and the movable valve B50, and the force-applying unit B80.

The force-applying unit A70 is configured to include: the fixed portion 71 that is connected to the hydraulic driver 700 and is disposed inside the valve box 10; and the movable portion 72 that is extendable in a direction from the fixed portion 71 toward the movable valve A60.

With this configuration, the force-applying unit A70 have two functions, that is, a function of causing the front-end portion 72a of the movable portion 72 to come into contact with a lower surface 60sb of the movable valve A60 and causing the movable valve A60 to move toward the first opening portion 12a and a function of causing the movable valve A60 to be conversely separated from the first opening portion 12a, and serves as the lifting and lowering mechanism of the valve body.

As shown in FIG. 3, as the end portion 72a of the movable portion 72 forming the force-applying unit A70 comes into contact with the lower face 60sb of the movable valve A60 (arrow F1), the movable valve A60 forming the neutral valve body 5 moves toward the inner surface of the valve box 10 (the valve box inner surface 10A of the valve box 10 which is located around the first opening portion 12a) (arrow F2). As a result of this movement, a state where the first seal portion 61 (valve plate sealing packing) is in contact with the valve box inner surface 10A of the valve box 10 is a state of a valve closed position (valve closed state).

Since the movable valve B50 and the movable valve A60 can move by the holding spring (force-applying unit B80) in the direction represented by reference numerals B1 and B2 (FIG. 2) (reciprocal direction) while being slidable to each other with the third seal portion 52 interposed therebetween, when this movement, the movable valve B50 also moves in the same direction as that of the movable valve A60.

(State where Valve Body is Located at Valve Closing Position (Positive Pressure or Non-Differential Pressure))

Hereinbelow, a state where the valve body is located at a valve closing position will be described with reference to FIGS. 7 to 10.

FIG. 7 is a vertical cross-sectional view showing the configuration of the gate valve according to the embodiment of the present disclosure. FIG. 8 is an enlarged view showing a relevant part taken along the line segment A-O shown in FIG. 1, FIG. 9 is an enlarged view showing a relevant part taken along the line segment B-O shown in FIG. 1, and FIG. 10 is an enlarged view showing a relevant part taken along the line segment C-O shown in FIG. 1.

A state where the neutral valve body 5 is located at a valve closing position means a state where the neutral valve body 5 is in contact with one of the inner surfaces of the valve box 10 (the valve box inner surface 10A located around the first opening portion 12a) but is not in contact with the other of the inner surfaces (the inner surface of the valve box 10 which is located around the second opening portion 12b).

The force-applying unit A70 (lifting and lowering mechanism) uses the hydraulic pressure and thereby causes the movable portion 72 to extend from the fixed portion 71 disposed inside the valve box 10 in a direction toward the movable valve A60 and causes the end portion 72a of the movable portion 72 to come into contact with the lower face 60sb of the movable valve A60. Consequently, as a result of causing the movable valve A60 to move toward the first opening portion 12a, the first seal portion 61 provided on the upper face 60sa of the movable valve A60 is in a state being in contact with the valve box inner surface 10A of the valve box 10 which is located at the periphery of the first opening portion 12a).

(State where Valve Body is Located at Back Pressure Position)

Hereinbelow, a state where the valve body is located at a back pressure position will be described with reference to FIGS. 12 to 15.

FIG. 12 is a vertical cross-sectional view showing the configuration of the gate valve according to the embodiment of the present disclosure. FIG. 13 is an enlarged view showing a relevant part taken along the line segment A-O shown in FIG. 1, FIG. 14 is an enlarged view showing a relevant part taken along the line segment B-O shown in FIG. 1, and FIG. 15 is an enlarged view showing a relevant part taken along the line segment C-O shown in FIG. 1.

A state where the neutral valve body 5 is located at a back pressure position means a state where the neutral valve body 5 is in contact with one of the inner surfaces of the valve box 10 (the valve box inner surface 10A located around the first opening portion 12a), while this condition is maintained, the neutral valve body is also in contact with the other of the inner surfaces (the inner surface of the valve box 10 which is located around the second opening portion 12b). The back pressure means that a pressure is applied to a valve body in a direction from a valve closed state to a valve opened state.

In the case where the neutral valve body 5 receives a back pressure, the force-applying unit B80 works which is located between the movable valve A60 and the movable valve B50 which form a valve body. That is, since the movable valve B50 and the movable valve A60 can move by the force-applying unit B80 in the direction represented by reference numerals B1 and B2 (FIG. 12) (reciprocal direction) while being slidable to each other with the third seal portion 52 interposed therebetween, when the neutral valve body 5 receives a back pressure, the movable valve B50 moves relative to the movable valve A60 in the direction represented by reference numeral B2.

As a result, the movable valve B50 is about to collide against the other of inner surfaces of the valve box 10 (the valve box inner surface 10B located around the second opening portion 12b). In order to release impact due to this collision, the movable valve B50 includes the second seal portion 51 provided at the position facing the valve box inner surface 10B located around the second opening portion 12b. As mentioned above, a mechanism in which the valve box inner surface 10B of the valve box 10 (back side body) receives the force received by the neutral valve body 5 (force received in the direction represented by reference numeral B2) is a back pressure cancellation mechanism.

As the second seal portion 51, an elastic body is preferably used. In the case where the movable valve B50 collides against the valve box inner surface 10B of the valve box 10, a countermeasure is necessary which prevents occurrence of contaminants which occur at the moment of collision or occurrence of contaminants which occur due to by generation of micro sliding contact when the valve box inner surface 10B of the valve box 10 (back side body) is deformed in millimeter order. When the second seal portion 51 is made of an elastic body, as the elastic body deforms when collision, occurrence of any contaminants can be prevented.

Modified Example of Embodiment

Figure 17:
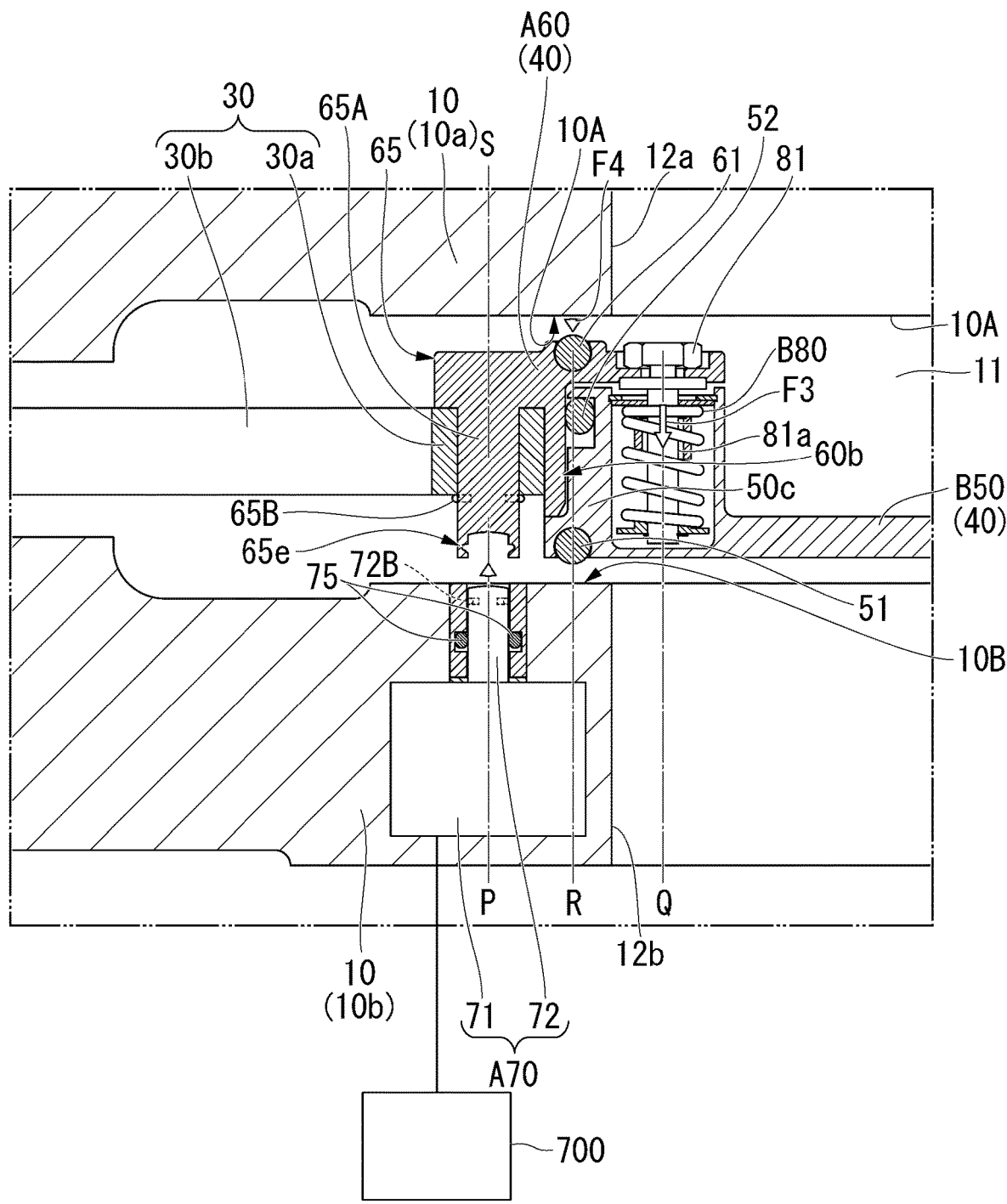
FIG. 17 is a vertical cross-sectional view showing a configuration of a gate valve according to a modified example of the embodiment of the present disclosure and is a view showing a case where the valve body is disposed at a position (FREE) at which a retraction operation can be carried out.
Figure 18:
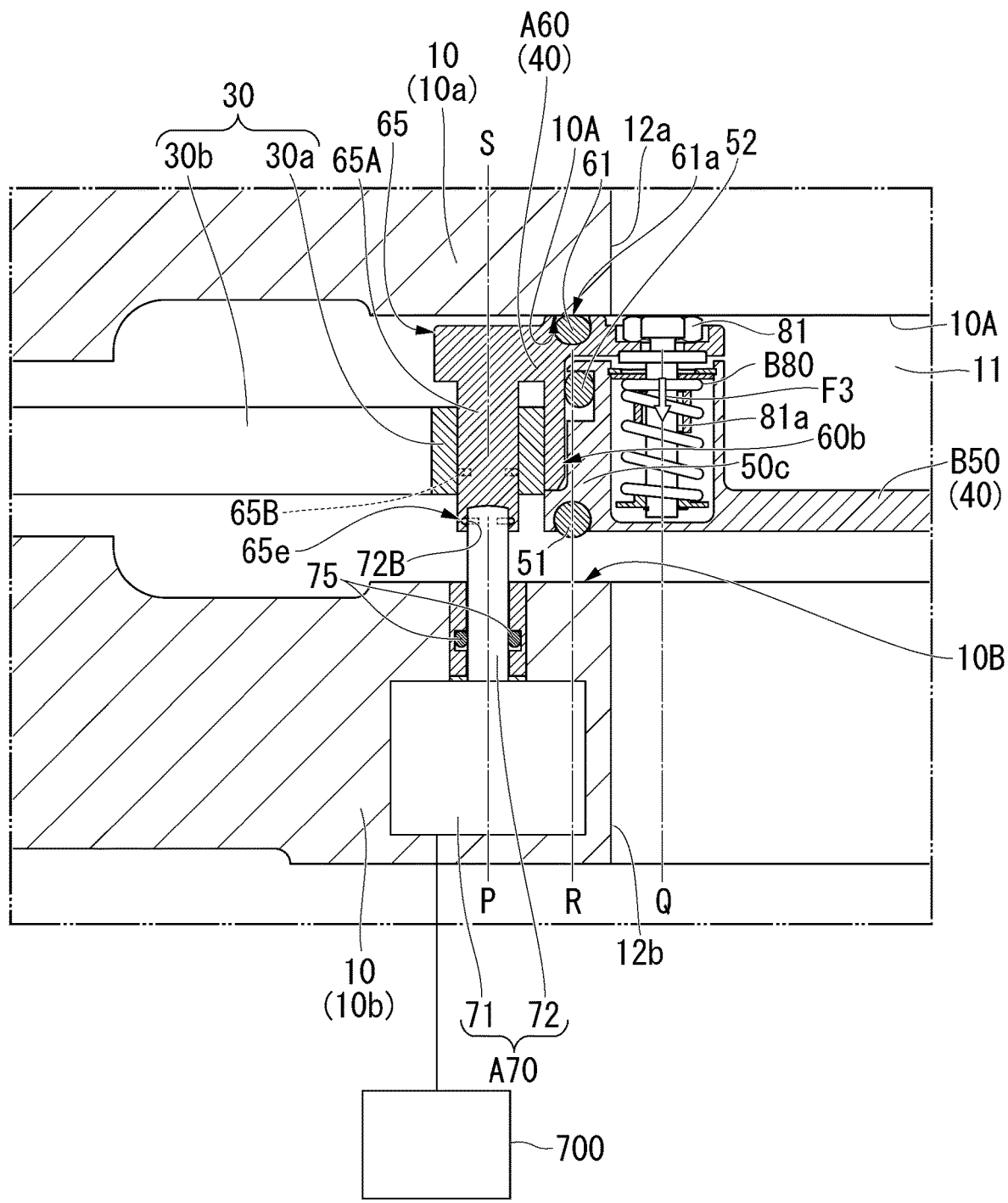
FIG. 18 is a vertical cross-sectional view showing the configuration of the gate valve according to a modified example of the embodiment of the present disclosure and is a view showing a case where the valve body is disposed at a valve closing position (positive pressure or non-differential pressure).
Figure 19:
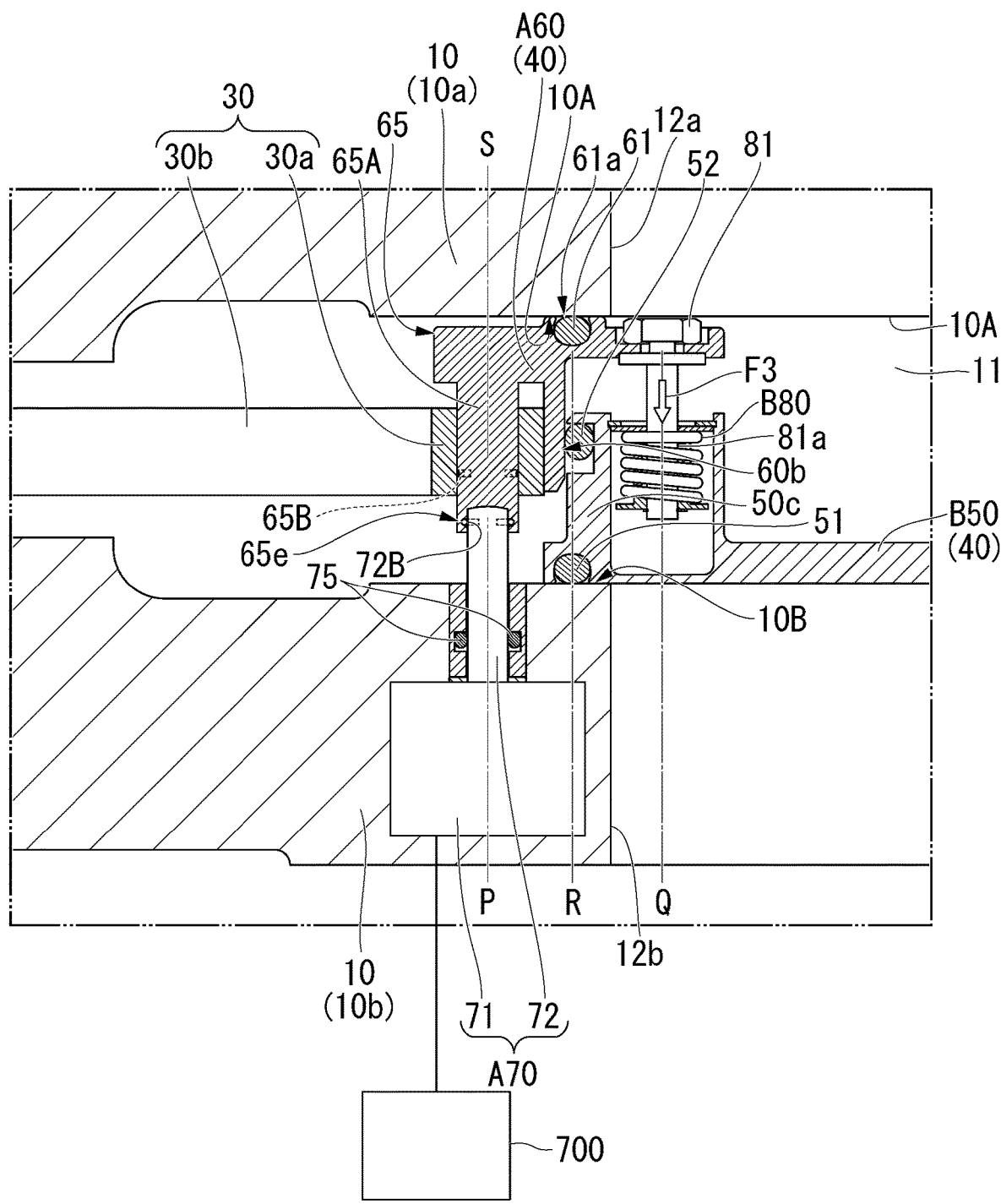
FIG. 19 is a vertical cross-sectional view showing the configuration of the gate valve according to a modified example of the embodiment of the present disclosure and is a view showing a case where the valve body is disposed at a back pressure position.

FIGS. 17 to 19 are vertical cross-sectional views, each showing a configuration of a gate valve according to a modified example of the embodiment of the present disclosure. FIG. 17 is an enlarged view showing a relevant part taken along the line segment A-O corresponding to FIG. 3 in the case where the valve body is disposed at a position (FREE) at which a retraction operation can be carried out. FIG. 18 is an enlarged view showing a relevant part taken along the line segment A-O corresponding to FIG. 8 in the case where the valve body is disposed at a valve closing position (positive pressure or non-differential pressure). FIG. 19 is an enlarged view showing a relevant part taken along the line segment A-O corresponding to FIG. 13 in the case where the valve body is disposed at a back pressure position.

FIGS. 17 to 19 shows a configuration example of the force-applying unit A70 having both a function of causing compressive force to act with respect to the movable valve A60 and a function of causing tensile force to act with respect to the movable valve A60.

Figure 16:
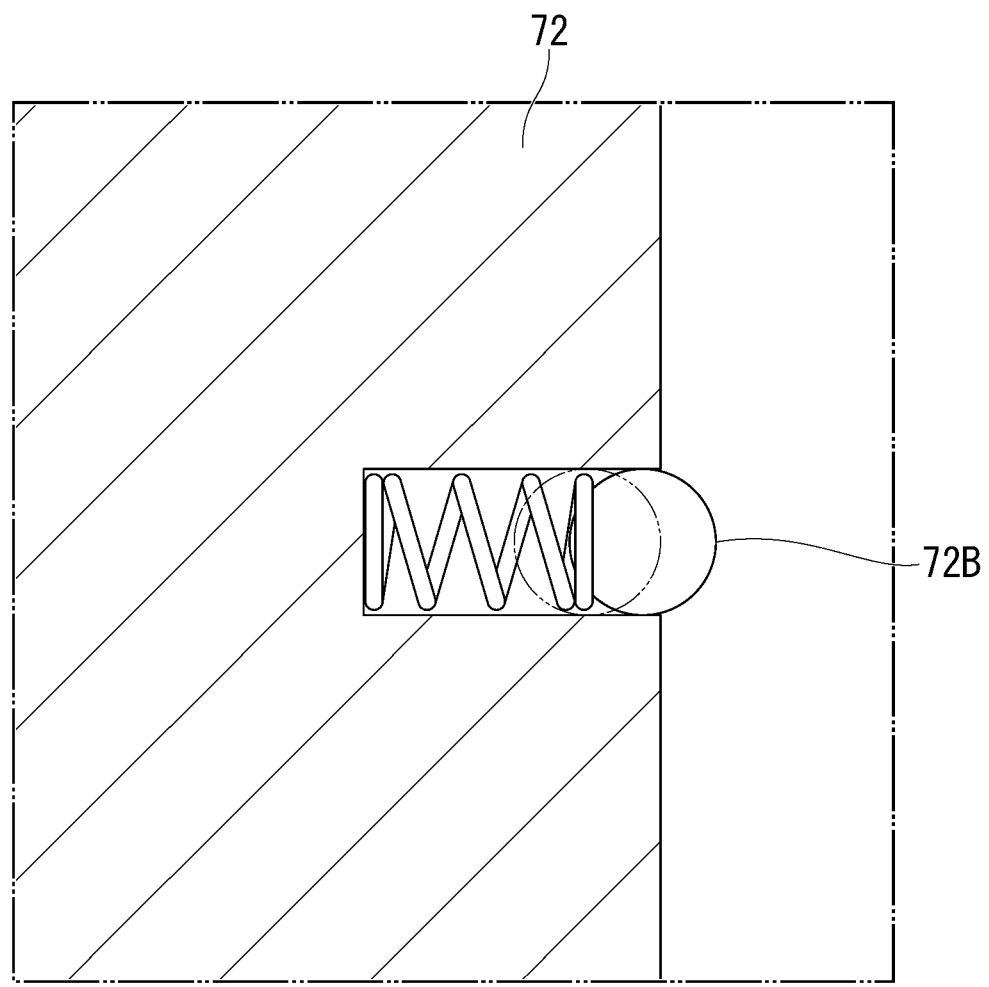
FIG. 16 is a view showing a ball plunger mechanism used in a modified example of the embodiment of the present disclosure.

In order to provide both the two functions, the force-applying unit A70 according to the modified example is configured to include: the fixed portion 71 disposed inside the valve box 10; and the movable portion 72 that can extend and contract in a direction from the fixed portion 71 toward the movable valve A60, and furthermore a ball plunger shown in FIG. 16 is implanted on the side surface of the movable portion 72. In the case where the movable portion 72 is in a state of being contracted so as to be disposed at the position close to the hydraulic pressure drive unit (fixed portion) 71, the ball plunger is located closer to the front-end side than a ring-shaped seal member (O-ring) 75.

Note that, it is preferable that a buffer space be provided for a countermeasure against oil leakage such as provision of a double seal at the portion at which the movable portion 72 linearly moves by the hydraulic pressure and the portion at which the seal member 75 is formed. Particularly, in the case where the movable portion 72 is configured to directly face a vacuum space, since the probability of oil contamination in the vacuum chamber can be reduced, it is particularly recommended. Furthermore, for the purpose of reducing the possibility of oil contamination in vacuum and atmospheric environments, it is preferable to use oil having a low vapor pressure as working fluid. Although the vapor pressure of the working fluid is determined by a required degree of vacuum or the like, generally, approximately $10^{-3}$ Pa or less is selected.

Here, "plunger" is a machine element part for positioning and fixing a work, the plunger is configured to include a plunger body; a spring built in the plunger body; and an end member (ball or pin) located at the end of the spring. The plunger has a mechanism in which, the end member enters the inside of the plunger body when a load is applied to the end member, and the end member returns to the original position due to action of force of the spring when the load is released.

Particularly, a ball plunger is a plunger in which a ball located at the end of the spring works, it is possible to lower the ball due to an applied load not only in a vertical direction but also in a horizontal direction, and therefore it is suitable for positioning of a sliding mechanism.

A ball plunger 72B is provided on the side surface of the movable portion 72, and in the movable valve A60, a recessed portion 65e that receives the end portion of the movable portion 72 and the ball plunger 72B is disposed at the portion 65A with which the end portion of the movable portion 72 is to be in contact. According to this configuration, the force-applying unit A70 according to the modified example can have both a function of causing compressive force to act with respect to the movable valve A60 by the hydraulic pressure and a function of causing tensile force to act with respect to the movable valve A60.

Note that, in the case where a compression coil spring built in the force-applying unit A70 is stopped in a state of being compressed, the repulsion force corresponding to the amount of displacement of the spring is equal to the force by the hydraulic pressure on the piston surface of the cylinder. That is, since the repulsion force of the spring is converted into the hydraulic pressure, the repulsion force is transmitted to the drive unit 705 via the hydraulic pressure generator 701. That is, if the drive unit 705 does not act the force equal to the repulsion force, an equilibrium state, that is, a stopped state cannot be maintained. However, in the configuration according to the embodiment, the hydraulic pressure circuit can be blocked by the solenoid valve 703. In particular, even where the drive unit 705 is in a state of receiving the repulsion force, if the solenoid valve 703 is shut off, a stopped state is maintained, and the drive unit 705 does not need to generate a force. As a result, it is possible to prevent an increase in temperature of the drive unit 705.

In addition, in the gate valve according to this modified example, similar to the configuration having the ball plunger 72B provided between the movable valve A60 and the movable portion 72 serving as part of the force-applying unit A70, a configuration is adopted which has a ball plunger 65B that is also provided between the neutral valve 30 and the position regulation portion 65 serving as part of the movable valve A60. Accordingly, the force-applying unit C90 of the aforementioned embodiment is not necessary.

Because of this, according to the gate valve of the modified example, as compared with the gate valve of the aforementioned embodiment, since it is possible to achieve isolation operation with a high degree of reliability and the weight of the valve body is further reduced, it is possible to further reduce a driving power that is necessary when the valve body moves upward and downward or the valve body moves while revolving. Accordingly, a normally close configuration is achieved and simplification of the configuration of the valve body and weight saving thereof are easily achieved.

In the gate valve according to the modified example, the force-applying unit B80 having the same configuration as that of the aforementioned embodiment is disposed between the movable valve B50 and the portion 67 that serves as part of the movable valve A60 and is located at the position overlapping the movable valve B50. As a result, also in the gate valve according to the modified example, a driving power that is necessary when the valve body moves upward and downward or the valve body moves while revolving is obtained by the force-applying unit B80.

That is, in the gate valve according to the modified example, as a result of adopting the configuration providing the ball plunger, it is possible to exclude the force-applying unit C90 from a valve structure, which is essential for the gate valve of the above-mentioned embodiment. For this reason, according to the modified example, it is possible to further reduce a driving power that is necessary when the valve body moves upward and downward or the valve body moves while revolving, it contributes to the gate valve that achieves simplification of the configuration of the valve body and weight saving thereof.

Note that, although a configuration providing two ball plungers 72B and 65B is disclosed in this modified example, it is not necessarily to incorporate two ball plungers together. That is, in the gate valve according to the aforementioned embodiment, from the configuration providing the two ball plungers 72B and 65B, any one ball plunger may be adopted.

Additionally, in the case where a plurality of force-applying units A70 are disposed inside the valve box 10, a configuration in which "structure that causes compressive force to act with respect to the movable valve A (first structure)" shown in the above-mentioned embodiment and "structure that has both a function of causing compressive force to act with respect to the movable valve A and a function of causing tensile force to act with respect to the movable valve A60 (second structure)" shown in the above-mentioned modified example are alternately disposed may be adopted as the force-applying unit A70. Alternatively, a configuration in which the second structure is disposed between two first structures or a configuration in which the first structure is disposed between two second structures may be adopted.

INDUSTRIAL APPLICABILITY

In a vacuum apparatus or the like, the present disclosure is widely applicable to a gate valve used for switching between: a state of isolating a flow passage that connects two spaces different from each other in characteristics such that a degree of vacuum, a temperature, or a gas atmosphere; and a state where the isolation state is released. Additionally, since a hydraulic circuit is a closed circuit in the present disclosure, regardless the installation posture of the gate valve, it is possible to maintain a safe and reliable operation state.

DESCRIPTION OF REFERENCE NUMERALS

5 . . . neutral valve body (valve body)
10, 10a, 10b . . . valve box
10A, 10B . . . valve box inner surface
11 . . . hollow portion
12a . . . first opening portion
12b . . . second opening portion
20 . . . rotation shaft
30 . . . neutral valve (arm)
30a . . . circular portion
30b . . . rotation portion (arm)
40 . . . movable valve
50 . . . movable valve B (second movable valve, movable valve plate: counter plate)
51 . . . second seal portion (counter cushion)
52 . . . third seal portion (slide sealing packing)
60 . . . movable valve A (first movable valve, movable valve frame: slide valve plate)
61 . . . first seal portion (valve plate sealing packing)
65 . . . position regulation portion
65B . . . ball plunger
70 . . . force-applying unit A (first force-applying unit, lifting and lowering mechanism)
71 . . . fixed portion
72 . . . movable portion
72B . . . ball plunger
80 . . . force-applying unit B (second force-applying unit, holding spring)

81 . . . holding spring (guide) pin
90 . . . force-applying unit C (third force-applying unit, auxiliary spring)
91 . . . auxiliary spring (pressure applying) pin
100 . . . gate valve
700 . . . hydraulic driver (incompressible-fluid driver)
701 . . . hydraulic pressure generator
702 . . . hydraulic pipe
703 . . . solenoid valve
704 . . . changeover valve
705 . . . drive unit
706 . . . controller (control unit)
707 . . . power supply
710 . . . hydraulic cylinder
711 . . . cylinder body
712 . . . piston
713 . . . hydraulic flow passage
714 . . . hydraulic space
720 . . . force-applying member
721 . . . inner spring
722 . . . outer spring
730 . . . cylinder drive unit
731 . . . drive shaft
731c . . . ball screw
732 . . . screw drive gear
732c . . . inner screw surface
732d . . . outer gear
733d . . . drive gear
733e . . . drive gear
734 . . . rotation shaft
735 . . . drive gear
736 . . . rotation shaft
737 . . . drive gear
750 . . . casing
751 . . . casing tube
752 . . . casing lid
753 . . . rear casing
754 . . . ring
755 . . . storage space
756 . . . rear space
757 . . . slide groove
758 . . . lid
760 . . . limiter switch

What is claimed is:

1. A gate valve, comprising:
a valve box having a hollow portion, a first opening portion, and a second opening portion, the first opening portion and the second opening portion being provided so as to face each other with the hollow portion interposed therebetween and forming a flow passage passing through the hollow portion;
a neutral valve body that is arranged in the hollow portion of the valve box and is capable of sealing the first opening portion; and
a rotation shaft that functions as a position switcher that drives the neutral valve body between a valve sealing position at which the neutral valve body is in a state of sealing the first opening portion and a valve opening position at which the neutral valve body is in an open state of being retracted from the first opening portion, the rotation shaft having an axis line extending in a flow passage direction, wherein
the neutral valve body comprises: a neutral valve connected to the position switcher; and
a movable valve connected to the neutral valve so that a position thereof with respect to the neutral valve in the flow passage direction is changeable,
the movable valve comprises a movable valve frame and a movable valve plate, the movable valve frame including a seal portion that is provided thereon, is circumferentially provided on the movable valve, and is to be in close contact with a valve box inner surface located at a periphery of the first opening portion, the movable valve frame being connected to the neutral valve so that a position thereof with respect to the neutral valve in the flow passage direction is changeable, the movable valve plate being slidable relative to the movable valve frame in the flow passage direction, and wherein
the gate valve comprises: a plurality of first force-applying units built in the valve box; a second force-applying unit disposed between the movable valve frame and the movable valve plate; and a third force-applying unit, each of the first force-applying units including a fixed portion and a movable portion, the fixed portion being disposed inside the valve box and being driven by incompressible fluid, the movable portion extending and contracting in a direction from the fixed portion toward the movable valve frame by the incompressible fluid of the fixed portion,
the third force-applying unit causes the movable valve frame to connect the neutral valve so that a position thereof with respect to the neutral valve in the flow passage direction is changeable, and the third force-applying unit applies a force to the movable valve frame to be directed to a center position in the flow passage direction,
the first force-applying units are driven by the incompressible fluid and have a function of applying a force to the movable valve frame to be directed to the first opening portion in the flow passage direction and thereby causing the seal portion to be in close contact with the valve box inner surface located at the periphery of the first opening portion,
the second force-applying unit drives the movable valve frame and the movable valve plate so that thicknesses thereof in the flow passage direction are changeable, and
the gate valve includes an incompressible-fluid driver that drives the first force-applying units by the incompressible fluid so as to cause the seal portion to be in close contact with the valve box inner surface located at the periphery of the first opening portion.

2. A gate valve, comprising:
a valve box having a hollow portion, a first opening portion, and a second opening portion, the first opening portion and the second opening portion being provided so as to face each other with the hollow portion interposed therebetween and forming a flow passage passing through the hollow portion;
a neutral valve body that is arranged in the hollow portion of the valve box and is capable of sealing the first opening portion; and
a rotation shaft that functions as a position switcher that drives the neutral valve body between a valve sealing position at which the neutral valve body is in a state of sealing the first opening portion and a valve opening position at which the neutral valve body is in an open state of being retracted from the first opening portion, the rotation shaft having an axis line extending in a flow passage direction, wherein
the neutral valve body comprises: a neutral valve connected to the position switcher; and a movable valve connected to the neutral valve so that a position thereof with respect to the neutral valve in the flow passage direction is changeable, the movable valve comprises a movable valve frame and a movable valve plate, the movable valve frame including a seal portion that is provided thereon, is circumferentially provided on the movable valve, and is to be in close contact with a valve box inner surface located at a periphery of the first opening portion, the movable valve frame being connected to the neutral valve so that a position thereof with respect to the neutral valve in the flow passage direction is changeable, the movable valve plate being slidable relative to the movable valve frame in the flow passage direction, and wherein the gate valve comprises: a plurality of first force-applying units built in the valve box;

and a second force-applying unit disposed between the movable valve frame and the movable valve plate, each of the first force-applying units including a fixed portion and a movable portion, the fixed portion being disposed inside the valve box and being driven by incompressible fluid, the movable portion extending and contracting in a direction from the fixed portion toward the movable valve frame by the incompressible fluid of the fixed portion, the first force-applying units are driven by the incompressible fluid and have: a function of applying a force to the movable valve frame to be directed to the first opening portion in the flow passage direction and thereby causing the seal portion to be in close contact with the valve box inner surface located at the periphery of the first opening portion;

and a function of causing the movable valve frame to connect the neutral valve so that a position thereof with respect to the neutral valve in the flow passage direction is changeable and applying a force to the movable valve frame to be directed to a center position in the flow passage direction, the second force-applying unit drives the movable valve frame and the movable valve plate so that thicknesses thereof in the flow passage direction are changeable, and the gate valve includes an incompressible-fluid driver that drives the first force-applying units by the incompressible fluid so as to cause the seal portion to be in close contact with the valve box inner surface located at the periphery of the first opening portion.

* * * * *